US012148394B2

(12) United States Patent
Kwon

(10) Patent No.: US 12,148,394 B2
(45) Date of Patent: Nov. 19, 2024

(54) VARIABLE TAP GAMMA AMPLIFIER, GAMMA VOLTAGE GENERATOR, AND DISPLAY DRIVING INTEGRATED CIRCUIT

(71) Applicant: Samsung Electronics Co., Ltd., Suwon-si (KR)

(72) Inventor: Taek Su Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 4 days.

(21) Appl. No.: 18/310,334

(22) Filed: May 1, 2023

(65) Prior Publication Data

US 2024/0005877 A1 Jan. 4, 2024

(30) Foreign Application Priority Data

Jun. 29, 2022 (KR) ........................ 10-2022-0079881

(51) Int. Cl.
*G09G 3/3275* (2016.01)

(52) U.S. Cl.
CPC ..... *G09G 3/3275* (2013.01); *G09G 2310/027* (2013.01); *G09G 2320/0276* (2013.01); *G09G 2320/0673* (2013.01); *G09G 2330/028* (2013.01)

(58) Field of Classification Search
CPC .. G09G 3/3275; G09G 3/3291; G09G 3/3208; G09G 2310/027; G09G 2320/0276; G09G 2320/0673; G09G 2330/028
See application file for complete search history.

(56) References Cited

U.S. PATENT DOCUMENTS

| | | | | |
|---|---|---|---|---|
| 7,760,178 | B2 | 7/2010 | Takada et al. | |
| 8,610,702 | B2 | 12/2013 | Kim et al. | |
| 8,854,294 | B2 | 10/2014 | Sakariya | |
| 9,305,491 | B2 | 4/2016 | Weitbruch et al. | |
| 10,559,280 | B2 | 2/2020 | Bae et al. | |
| 2006/0087483 | A1* | 4/2006 | Takada | G09G 3/3688 345/89 |
| 2009/0135116 | A1* | 5/2009 | Chang | G09G 3/3696 345/87 |
| 2010/0231577 | A1 | 9/2010 | Kim et al. | |
| 2011/0175942 | A1 | 7/2011 | Ahn et al. | |

(Continued)

FOREIGN PATENT DOCUMENTS

| | | |
|---|---|---|
| JP | 2009-139441 | 6/2009 |
| KR | 10-0893392 | 4/2009 |

(Continued)

*Primary Examiner* — David Tung
(74) *Attorney, Agent, or Firm* — Fish & Richardson P.C.

(57) ABSTRACT

Among the implementations described herein is a gamma voltage generator which includes a first resistor string that is connected between a 0-th terminal and a first terminal and outputs first gamma voltages, a 0-th gamma amplifier that outputs a 0-th tap voltage to the 0-th terminal by using a 0-th reference voltage, a first variable tap gamma amplifier that outputs a first tap voltage to the first terminal by using a first reference voltage, and a gamma control logic circuit that selectively activates a first tap change signal based on a first grayscale ratio of first line data. The first variable tap gamma amplifier outputs a second tap voltage to a first central terminal of the first resistor string by using a second reference voltage, in response to the first tap change signal thus activated.

20 Claims, 20 Drawing Sheets

(56) References Cited

U.S. PATENT DOCUMENTS

| | | | | |
|---|---|---|---|---|
| 2011/0175943 | A1 | 7/2011 | Ahn et al. | |
| 2013/0321489 | A1* | 12/2013 | Kishikawa | G09G 3/22 345/84 |
| 2015/0170594 | A1 | 6/2015 | Cho | |
| 2015/0170609 | A1* | 6/2015 | Jung | G09G 3/20 345/212 |
| 2020/0211457 | A1* | 7/2020 | Kim | G09G 3/3233 |

FOREIGN PATENT DOCUMENTS

| | | |
|---|---|---|
| KR | 10-2015-0045300 | 5/2015 |
| KR | 10-2018-0043563 | 4/2018 |
| KR | 10-2256357 | 5/2021 |

* cited by examiner

FIG. 14

| GAMP | GAMP Output | | Range for TC |
|---|---|---|---|
| | Main-Output | Sub-Output | |
| GAMP0 | V0 | - | - |
| GAMP1 | V1 | - | - |
| GAMP2 | V15 | - | - |
| VTGAMP3 | V39 | V27 | V23 ~ V31 |
| VTGAMP4 | V63 | V51 | V47 ~ V55 |
| VTGAMP5 | V87 | V75 | V71 ~ V79 |
| VTGAMP6 | V111 | V99 | V95 ~ V103 |
| VTGAMP7 | V135 | V123 | V119 ~ V127 |
| VTGAMP8 | V159 | V147 | V143 ~ V151 |
| VTGAMP9 | V183 | V171 | V167 ~ V175 |
| VTGAMP10 | V207 | V195 | V191 ~ V199 |
| VTGAMP11 | V231 | V219 | V215 ~ V223 |
| VTGAMP12 | V255 | V243 | V239 ~ V247 |

VARIABLE TAP GAMMA AMPLIFIER, GAMMA VOLTAGE GENERATOR, AND DISPLAY DRIVING INTEGRATED CIRCUIT

CROSS-REFERENCE TO RELATED APPLICATIONS

This application claims priority under 35 U.S.C. § 119 to Korean Patent Application No. 10-2022-0079881 filed on Jun. 29, 2022, in the Korean Intellectual Property Office, the disclosures of which are incorporated by reference herein in their entireties.

BACKGROUND

Implementations of the present disclosure described herein relate to a display device, and more particularly, relate to a variable tap gamma amplifier, a gamma voltage generator, and a display driving integrated circuit.

An organic light-emitting diode (OLED) is being developed as one of light-emitting elements. Because the organic light-emitting diode has a spontaneous light-emitting characteristic, the organic light-emitting diode does not require an additional component for light-emitting, such as a backlight unit. Accordingly, a display device using the organic light-emitting diode is being researched and developed. A display panel including the organic light-emitting diode may include pixels arranged in rows and columns. Each pixel includes one organic light-emitting diode and one transistor. The transistor may adjust brightness of the organic light-emitting diode by adjusting the amount of current flowing through the organic light-emitting diode.

SUMMARY

Implementations of the present disclosure provide a variable tap gamma amplifier with improved performance, a gamma voltage generator including the variable tap gamma amplifier, and a display driving integrated circuit including the gamma voltage generator.

According to some implementations, a gamma voltage generator includes a first resistor string that is connected between a 0-th terminal and a first terminal and outputs first gamma voltages, a 0-th gamma amplifier that outputs a 0-th tap voltage to the 0-th terminal by using a 0-th reference voltage, a first variable tap gamma amplifier that outputs a first tap voltage to the first terminal by using a first reference voltage, and a gamma control logic circuit that selectively activates a first tap change signal based on a first grayscale ratio of first line data. The first variable tap gamma amplifier outputs a second tap voltage to be provided to a first central terminal of the first resistor string by using a second reference voltage, in response to the first tap change signal thus activated.

According to some implementations, a display driving integrated circuit includes a row driver that controls a plurality of gate lines connected with a display panel, a gamma voltage generator that generates a plurality of gamma voltages, a data driver that controls a plurality of data lines connected with the display panel based on line data, by using the plurality of gamma voltages, and a gamma control logic circuit that controls the gamma voltage generator. The gamma voltage generator includes a first variable tap gamma amplifier that generates a first tap voltage corresponding to a first gamma voltage among the plurality of gamma voltages. The gamma control logic circuit selectively activates a first tap change signal based on a first grayscale ratio of the line data. The first variable tap gamma amplifier generates a second tap voltage corresponding to a second gamma voltage, which is different from the first gamma voltage, from among the plurality of gamma voltages in response to the first tap change signal thus activated.

According to some implementations, a variable tap gamma amplifier includes an input switch that selects one of a first reference voltage and a second reference voltage as a non-inverting input voltage in response to a first tap change signal, a feedback switch that selects one of a first tap voltage and a second tap voltage as an inverting input voltage in response to the first tap change signal, an input stage that generates a pull-up voltage and a pull-down voltage based on the inverting input voltage and the non-inverting input voltage, a main-output stage that generates the first tap voltage based on the pull-up voltage and the pull-down voltage, and a sub-output stage that generates the second tap voltage based on the pull-up voltage and the pull-down voltage. The first tap voltage is provided to an external data driver as a first gamma voltage, the second tap voltage is provided to the external data driver as a second gamma voltage, and the first tap change signal is generated based on a grayscale ratio of a gamma range including the second gamma voltage from among line data updated in the external data driver.

BRIEF DESCRIPTION OF THE FIGURES

The above and other objects and features of the present disclosure will become apparent by describing in detail implementations thereof with reference to the accompanying drawings.

FIG. 14 is a diagram illustrating an example of a main-output, a sub-output, and a gamma range associated with a gamma voltage generator of FIG. 1.

DETAILED DESCRIPTION

Below, implementations of the present disclosure will be described in detail and clearly to such an extent that an ordinary one in the art easily implements the invention.

Figure 1:
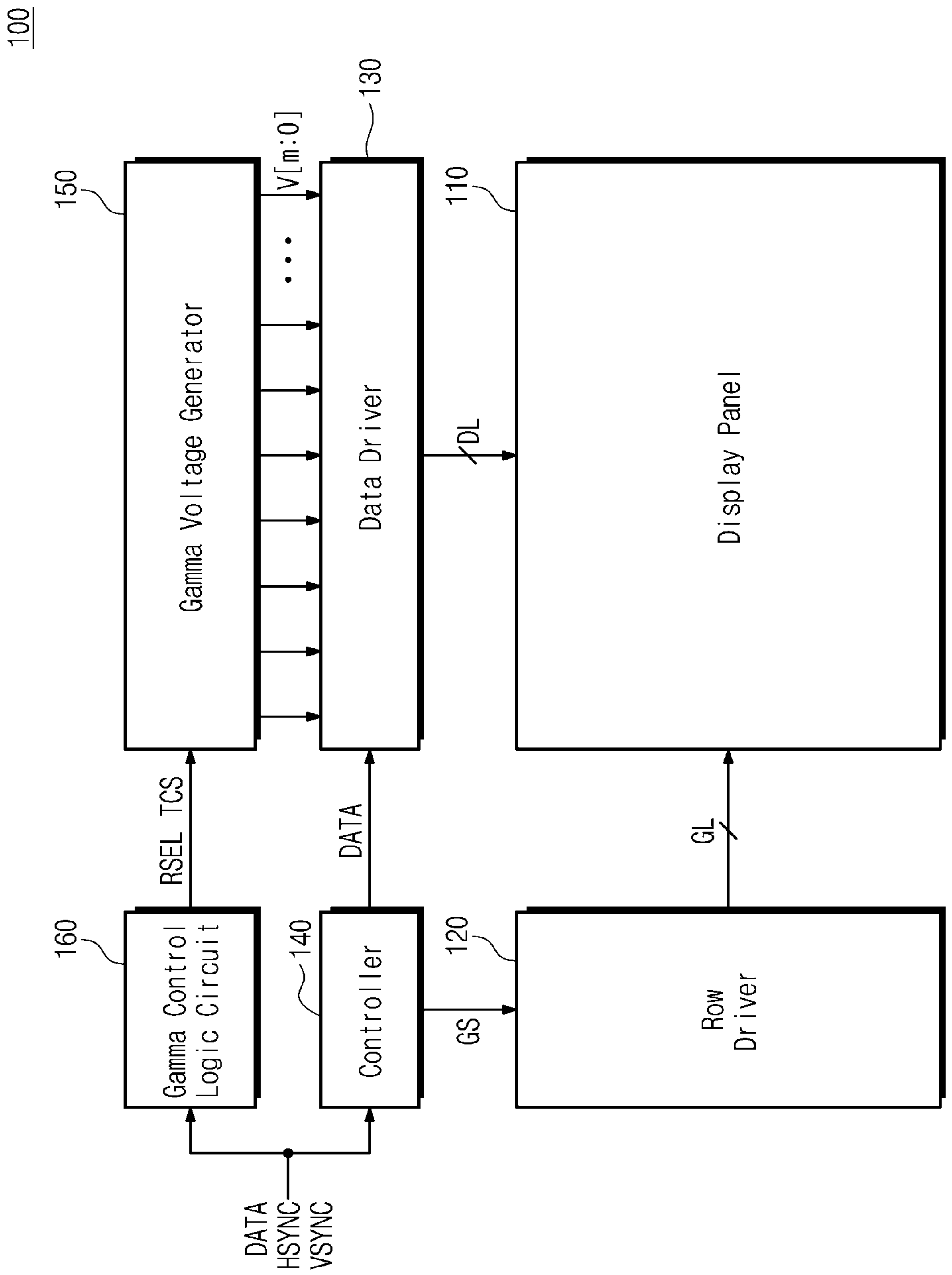
FIG. 1 is a block diagram illustrating a display device according to some implementations of the present disclosure.

FIG. 1 is a block diagram illustrating a display device according to some implementations of the present disclosure. Referring to FIG. 1, a display device 100 may include a display panel 110, a row driver 120, a data driver 130, a controller 140, a gamma voltage generator 150, and a gamma control logic circuit 160. In some implementations, all or some of the row driver 120, the data driver 130, the controller 140, the gamma voltage generator 150, and the gamma control logic circuit 160 may be included in a display driving integrated circuit (DDI). In some implementations, the gamma control logic circuit 160 may be included in the gamma voltage generator 150 or may be implemented independently.

The display panel 110 may include a plurality of pixels. The plurality of pixels may be arranged in rows and columns. The plurality of pixels may be connected with data lines (or source lines) DL and gate lines (or scan lines) GL. In some implementations, the display panel 110 may include various display panels such as a liquid crystal display panel, an organic light-emitting display panel, an electrophoretic display panel, or an electrowetting display panel. However, the display panel 110 according to the present disclosure is not limited thereto. For example, the display panel 110 according to the present disclosure may be implemented with the above display panels or any other display panels. In some implementations, the display device 100 including the liquid crystal display panel may further include a polarizer (not illustrated), a backlight unit (not illustrated), etc. Below, for convenience of description, it is assumed that the display panel 110 is an organic light-emitting display panel including pixels based on an organic light-emitting diode (OLED).

The row driver 120 may be connected with the display panel 110 through the gate lines GL. The row driver 120 may receive a gate signal GS from the controller 140 and may control voltages of the gate lines GL in response to the gate signal GS. For example, the row driver 120 may sequentially provide the gate signals GS to the gate lines GL in response to the gate signal GS.

The data driver 130 may be connected with the display panel 110 through the data lines DL. The data driver 130 may receive data "DATA" from the controller 140 and may control voltages of the data lines DL based on the data "DATA" thus received. For example, the data driver 130 may receive a plurality of gamma voltages V[m:0] from the gamma voltage generator 150 and may control voltages of the data lines DL based on the data "DATA" by using the plurality of gamma voltages V[m:0]. In some implementations, the data driver 130 may include source drivers configured to control voltages of the data lines DL.

The controller 140 may receive various data "DATA" and one or more of the following control signals from an external device (e.g., a graphic processing unit or application processor): a horizontal synchronization signal HSYNC and a vertical synchronization signal VSYNC. The controller 140 may control various components of the display panel 110 in response to the received control signals such that an image corresponding to the data "DATA" is displayed through the display panel 110.

The gamma voltage generator 150 may be configured to generate the plurality of gamma voltages V[m:0] that are used in the data driver 130. For example, the gamma voltage generator 150 may be configured to generate the plurality of gamma voltages V[m:0] depending on a given or separately set gamma curve. A configuration and an operation of the gamma voltage generator 150 will be described in detail with reference to drawings below.

In some implementations, the display device 100 may further include the gamma control logic circuit 160. The gamma control logic circuit 160 may be configured to control the gamma voltage generator 150 based on the data "DATA", the vertical synchronization signal VSYNC, and/or the horizontal synchronization signal HSYNC. For example, the gamma control logic circuit 160 may generate a reference voltage selection signal RSEL and a tap change signal TCS based on the data "DATA", the vertical synchronization signal VSYNC, and/or the horizontal synchronization signal HSYNC. The reference voltage selection signal RSEL may refer to a signal for selecting various reference voltages that are used in the gamma voltage generator 150. The tap change signal TCS may refer to a signal for changing a tap that is connected with an output terminal of a gamma amplifier included in the gamma voltage generator 150.

The gamma control logic circuit 160 may generate the reference voltage selection signal RSEL based on information (e.g., a gamma curve) that is set in advance or is set by the user. The gamma voltage generator 150 may generate or select reference voltages for generating the plurality of gamma voltages V[m:0] based on the reference voltage selection signal RSEL.

The gamma control logic circuit 160 may generate the tap change signal TCS based on a grayscale ratio indicated by the data "DATA". For example, the gamma voltage generator 150 may operate in response to the tap change signal TCS such that, based on the tap change signal TCS, the output terminal of the gamma amplifier of the gamma voltage generator 150 is connected with a given tap and a given gamma voltage is output.

For example, in some implementations, the gamma voltage generator 150 may generate the plurality of gamma voltages V[m:0] by using a resistor string. In the case where a ratio/proportion of data corresponding to gamma voltages belonging to a specific range from among the plurality of gamma voltages V[m:0] is high, levels of the gamma voltages of the specific range output through the resistor string may sharply fluctuate. In this case, voltages of the data lines DL that are controlled by the data driver 130 may become unstable. Accordingly, the gamma control logic circuit 160 may reduce or prevent the fluctuations in gamma voltages of a specific range by generating the tap change signal TCS based on the grayscale ratio of the data "DATA" and changing a tap to be connected with the output terminal of the gamma amplifier (e.g., performing a tap changing operation) in response to the tap change signal TCS. The tap changing operation of the gamma voltage generator 150 of some implementations will be described in detail with reference to drawings below.

The gamma control logic circuit 160 may be included in the controller 140 (or a timing controller) or may be implemented independently. Alternatively, the gamma control logic circuit 160 may be implemented with a separate processor, software, firmware, or a hardware component for driving the software and firmware.

Below, for convenience of description, the terms data "DATA", the grayscale ratio of the data "DATA", etc. are used. The data "DATA" may indicate row data or line data that are output through the display panel 110 by the operation of the display device 100 and correspond to one color channel corresponding to one row or one line. That is, in the case where the display panel 110 is implemented to display RGB colors, the data "DATA" that are used in the specification may indicate R-channel data, G-channel data, or B-channel data corresponding to one row or one line in the display panel 110. The grayscale ratio of the data "DATA" may indicate a ratio of data having each gamma voltage or a grayscale corresponding to each gamma range, in the R-channel data, the G-channel data, or the B-channel data corresponding to one row or one line.

For example, in an example, it is assumed that 256 grayscale levels are used and the number of unit data of one channel data "DATA" is 1440. In this case, the grayscale levels may respectively correspond to the plurality of gamma voltages V[m:0]. The unit data of one channel data "DATA" may mean the number of pixels (in detail, pixels having the same color as the corresponding channel) included in one row or one line of the display panel 110. In this case, in one channel data "DATA", when the number of unit data (e.g., the number of pixels) having a grayscale corresponding to the 100th gamma voltage is 1220, the number of unit data having a grayscale corresponding to the 150th gamma voltage is 610, and the number of unit data having a grayscale corresponding to the 200th gamma voltage is 610, the grayscale ratio of the 100th gamma voltage to the data "DATA" may be 0.5, the grayscale ratio of the 150th gamma voltage to the data "DATA" may be 0.25, and the grayscale ratio of the 200th gamma voltage to the data "DATA" may be 0.25. However, the present disclosure is not limited thereto.

Figure 2:
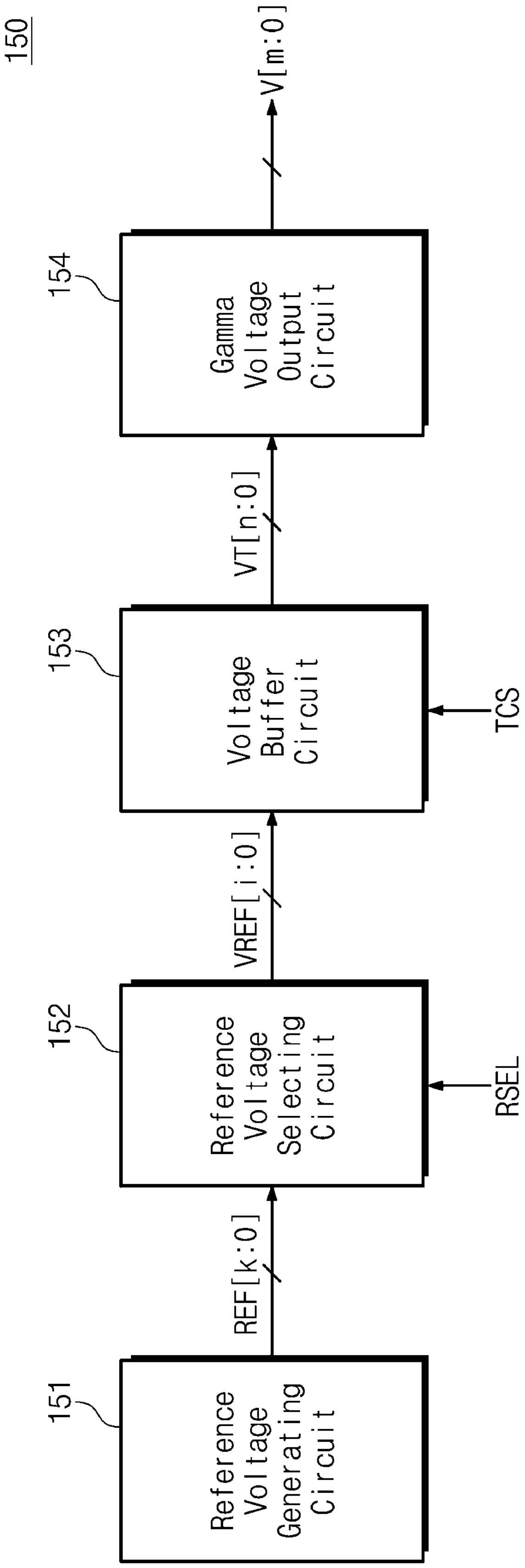
FIG. 2 is a block diagram illustrating a gamma voltage generator of FIG. 1.

FIG. 2 is a block diagram illustrating a gamma voltage generator of FIG. 1. Referring to FIGS. 1 and 2, the gamma voltage generator 150 may include a reference voltage generating circuit 151, a reference voltage selecting circuit 152, a voltage buffer circuit 153, and a gamma voltage output circuit 154.

The reference voltage generating circuit 151 may generate a plurality of reference voltages REF[k:0] that are used in the gamma voltage generator 150. For example, the reference voltage generating circuit 151 may include a resistor string connected in series between a power supply voltage and a ground voltage. The plurality of reference voltages REF[k:0] may be respectively output from connection nodes between a plurality of resistors included in the resistor string. In some implementations, depending on a gamma curve that is set in advance or by the user, a resistance value of each of the plurality of resistors included in the reference voltage generating circuit 151 may be set or adjusted such that various gamma voltages are provided.

The reference voltage selecting circuit 152 may select one or more of the plurality of reference voltages REF[k:0] received from the reference voltage generating circuit 151 in response to the reference voltage selection signal RSEL. The reference voltage selecting circuit 152 may output reference voltages VREF[i:0] thus selected.

The voltage buffer circuit 153 may generate a plurality of tap voltages VT[n:0] based on the reference voltages VREF [i:0] selected by the reference voltage selecting circuit 152. For example, the voltage buffer circuit 153 may include a plurality of gamma amplifiers. The plurality of gamma amplifiers may respectively receive the reference voltages VREF[i:0] and may respectively output a plurality of tap voltages VT[n:0]. In some implementations, at least one of the plurality of gamma amplifiers or some of the plurality of gamma amplifiers may be implemented with a variable tap gamma amplifier configured to perform a tap changing operation in response to a tap change signal TCS. A configuration of the voltage buffer circuit 153 will be described in detail with reference to drawings below.

The gamma voltage output circuit 154 may output the plurality of gamma voltages V[m:0] by using the plurality of tap voltages VT[n:0]. For example, the gamma voltage output circuit 154 may include a resistor string where a plurality of resistors are connected in series. The plurality of tap voltages VT[n:0] may be applied to connection nodes between some resistors of the resistor string, and the plurality of gamma voltages V[m:0] may be output between connection nodes of resistors of the resistor string.

Although not illustrated in drawing, the gamma voltage generator 150 may generate different gamma voltages every channel. For example, in the case where the display panel 110 is implemented to display RGB colors, the gamma voltage generator 150 may be configured to generate a plurality of R-channel gamma voltages corresponding to the R-channel, a plurality of G-channel gamma voltages corresponding to the G-channel, and a plurality of B-channel gamma voltages corresponding to the B-channel. However, below, for brevity of drawing and for convenience of description, the description will be given as the gamma voltage generator 150 generates a plurality of gamma voltages corresponding to one channel. However, the present disclosure is not limited thereto.

Figure 3:
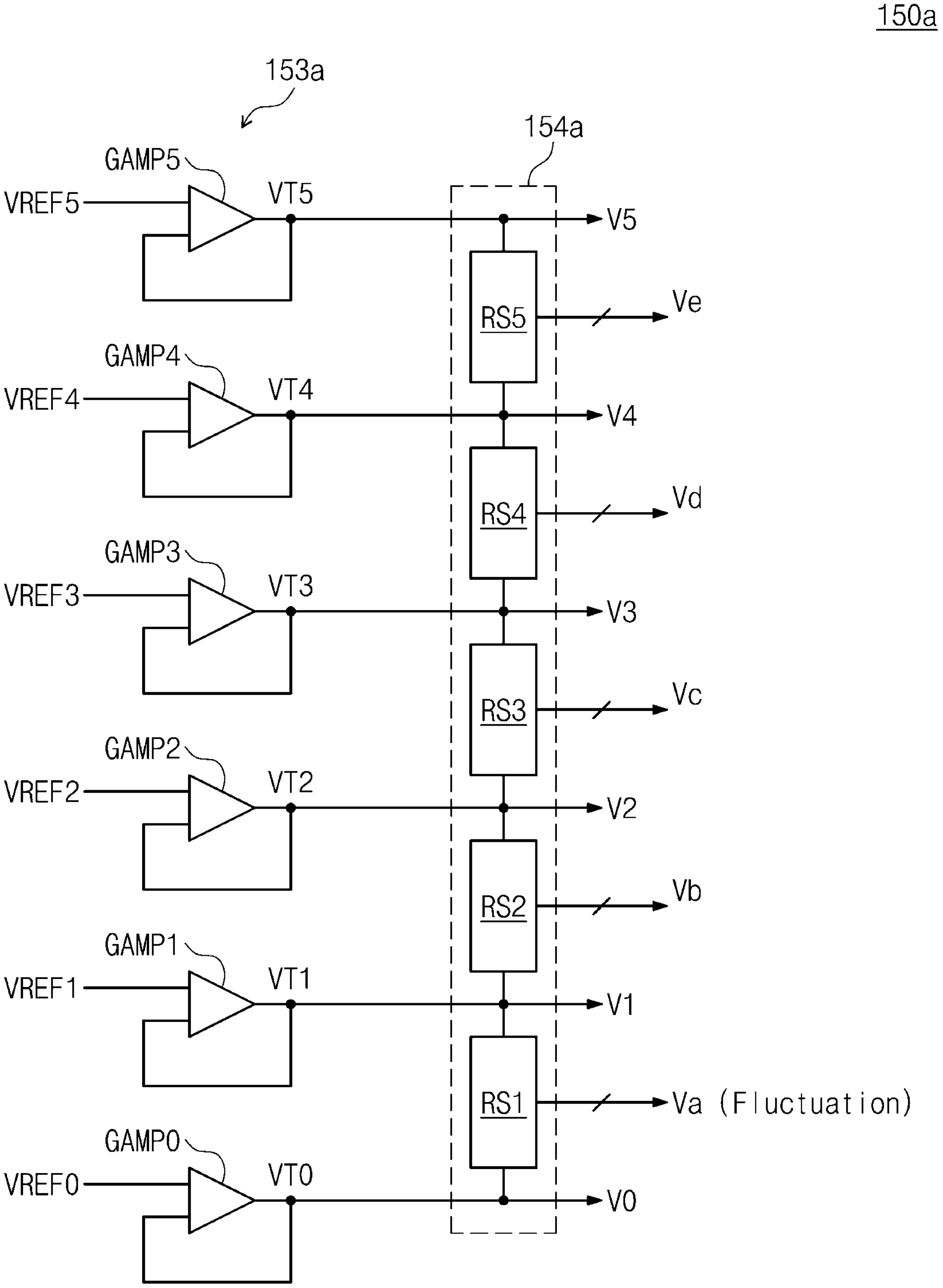
FIG. 3 is a diagram illustrating a gamma voltage generator of FIG. 2, for example, a voltage buffer circuit and a gamma voltage output circuit.

FIG. 3 is a diagram illustrating a gamma voltage generator of FIG. 2, for example, a voltage buffer circuit and a gamma voltage output circuit. Referring to FIGS. 1 to 3, a gamma voltage generator 150*a* may include a voltage buffer circuit 153*a* and a gamma voltage output circuit 154*a*.

The gamma voltage generator 150*a* may include a plurality of gamma amplifiers GAMP0 to GAMP5. The plurality of gamma amplifiers GAMP0 to GAMP5 may generate a plurality of tap voltages VT1 to VT5 based on a plurality of reference voltages VREF0 to VREF5 (e.g., reference voltages selected by the reference voltage selecting circuit 152). For example, the 0-th gamma amplifier GAMP0 may receive the 0-th reference voltage VREF0 as a non-inverting input and may output the 0-th tap voltage VT0 corresponding to the 0-th reference voltage VREF0. The 0-th gamma amplifier GAMP0 may receive the 0-th tap voltage VT0 as an inverting input, e.g., for the purpose of maintaining the level of the 0-th tap voltage VT0. The first gamma amplifier GAMP1 may receive the first reference voltage VREF1 as a non-inverting input and may output the first tap voltage VT1 corresponding to the first reference voltage VREF1. The first gamma amplifier GAMP1 may receive the first tap voltage VT1 as an inverting input, e.g., for the purpose of maintaining the level of the first tap voltage VT1. Likewise, the second to fifth gamma amplifiers GAMP2 GAMP5 may receive the second to fifth reference voltages VREF2 to VREF5 as non-inverting inputs thereof and may output the second to fifth tap voltages VT2 to VT5 respectively corresponding to the second to fifth reference voltages VREF2 to VREF5. The second to fifth gamma amplifiers GAMP2 to GAMP5 may receive the second to fifth tap voltages VT2 to VT5 as inverting inputs thereof, e.g., for the purpose of maintaining the second to fifth tap voltages VT2 to VT5. Although five gamma amplifiers and five gamma voltages are illustrated in FIG. 3, implementations according to this disclosure may include more or fewer gamma amplifiers and/or gamma voltages.

In some implementations, the 0-th tap voltage VT0 may be output as the 0-th gamma voltage V0. The first tap voltage VT1 may be output as the first gamma voltage V1. The second tap voltage VT2 may be output as the second gamma voltage V2. The third tap voltage VT3 may be output as the third gamma voltage V3. The fourth tap voltage VT4 may be output as the fourth gamma voltage V4. The fifth tap voltage VT5 may be output as the fifth gamma voltage V5.

The gamma voltage output circuit **154*a*** may include a plurality of resistor string RS1 to RS5. Each of the plurality of resistor string RS1 to RS5 may include a plurality of resistors connected in series between opposite ends thereof. A plurality of gamma voltages Va to Ve may be output by/from the plurality of resistors.

For example, the first resistor string RS1 may be connected between the 0-th tap voltage VT0 and the first tap voltage VT1. The one or more a-th gamma voltages Va may be output by the plurality of resistors in the first resistor string RS1. In this case, the one or more of a-th gamma voltages Va may have levels between the first tap voltage VT1 and the 0-th tap voltage VT0, and the levels of the a-th gamma voltages Va may be determined by resistance values of the plurality of resistors in the first resistor string RS1.

The second resistor string RS2 may be connected between the first tap voltage VT1 and the second tap voltage VT2. One or more of b-th gamma voltages Vb may be output by the plurality of resistors in the second resistor string RS2. In this case, the one or more of b-th gamma voltages Vb may have levels between the second tap voltage VT2 and the first tap voltage VT1, and the levels of the b-th gamma voltages Vb may be determined by resistance values of the plurality of resistors in the second resistor string RS2.

Likewise, the third resistor string RS3 may be connected between the second tap voltage VT2 and the third tap voltage VT3, the fourth resistor string RS4 may be connected between the third tap voltage VT3 and the fourth tap voltage VT4, and the fifth resistor string RS5 may be connected between the fourth tap voltage VT4 and the fifth tap voltage VT5. One or more c-th gamma voltages Vc, one or more d-th gamma voltages Vd, and one or more e-th gamma voltages Ve may be output by the third resistor string RS3, the fourth resistor string RS4, and the fifth resistor string RS5. The one or more c-th gamma voltages Vc may have levels between the third tap voltage VT3 and the second gamma voltage V2, and the levels of the c-th gamma voltages Vc may be determined by resistance values of the plurality of resistors in the third resistor string RS3. The one or more d-th gamma voltages Vd may have levels between the fourth tap voltage VT4 and the third tap voltage VT3, and the levels of the d-th gamma voltages Vd may be determined by resistance values of the plurality of resistors in the fourth resistor string RS4. The one or more e-th gamma voltages Ve may have levels between the fifth tap voltage VT5 and the fourth tap voltage VT4, and the levels of the e-th gamma voltages Ve may be determined by resistance values of the plurality of resistors in the fifth resistor string RS5. In some implementations, as described in examples herein, there are a plurality of a-th gamma voltages Va, a plurality of b-th gamma voltages Vb, a plurality of c-th gamma voltages Vc, a plurality of d-th gamma voltages Vd, and/or a plurality of e-th gamma voltages Ve.

In some implementations, the gamma voltages V0, V1, V2, V3, V4, V5, Va, Vb, Vc, Vd, and Ve generated by the gamma voltage output circuit **154*a* may be used by the data driver 130. In the case where a ratio associated with a specific grayscale is high in data (e.g., channel data) corresponding to one row or one line, a gamma voltage corresponding to the specific grayscale may fluctuate. For example, in data (e.g., channel data) corresponding to one row or one line, when a grayscale ratio associated with some of the a-th gamma voltages Va is high, the a-th gamma voltages Va may experience the fluctuation. In this case, a noise may occur in an image displayed in the display panel 110**.

Figure 4:
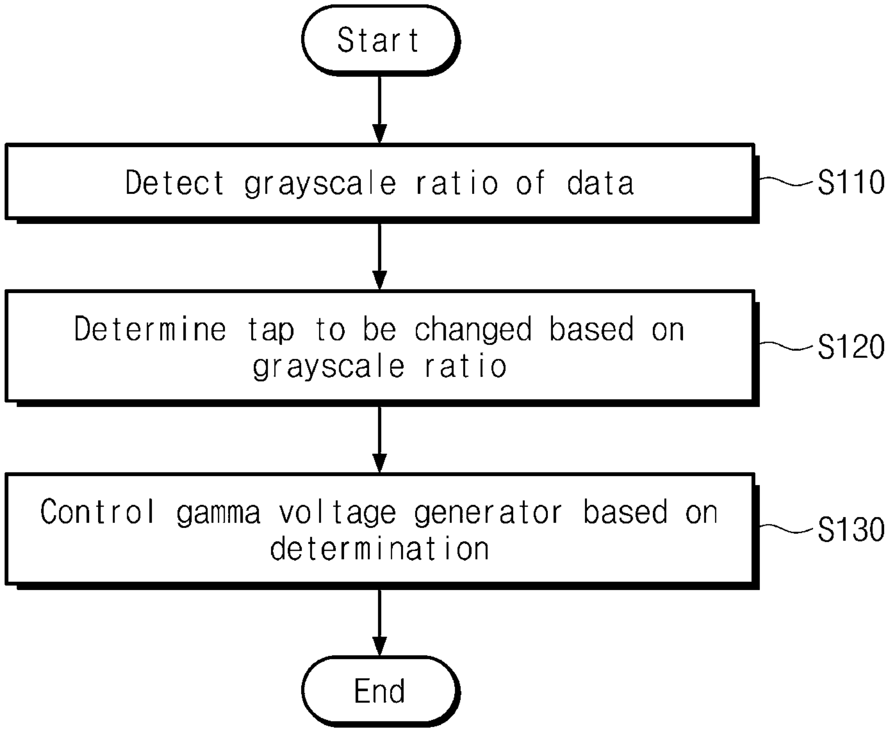
FIG. 4 is a flowchart for describing an operation of a gamma control logic circuit of FIG. 1.

FIG. 4 is a flowchart for describing an operation of a gamma control logic circuit of FIG. 1. Referring to FIGS. 1, 2, and 4, in operation S110, the gamma control logic circuit 160 may detect a grayscale ratio of the data "DATA". For example, as described with reference to FIG. 1, the gamma control logic circuit 160 may receive the data "DATA" that are provided to the data driver 130 or the controller 140. The gamma control logic circuit 160 may detect the grayscale ratio of the data "DATA" with regard to one row or one line. The grayscale ratio is described with reference to FIG. 1, and thus, additional description will be omitted to avoid redundancy.

In operation S120, the gamma control logic circuit 160 may determine a tap (or a gamma tap) to be changed, based on the grayscale ratio. For example, when a grayscale ratio associated with a specific grayscale or a specific grayscale range of the data "DATA" is greater than or equal to a given threshold value, the gamma control logic circuit 160 may determine a tap to be changed by the tap changing operation. In some implementations, when a specific grayscale or a specific grayscale range having a grayscale ratio greater than or equal to the threshold value is absent in the data "DATA", the tap changing operation may not be performed.

In operation S130, the gamma control logic circuit 160 may control the gamma voltage generator 150 based on a determination result. For example, when the grayscale ratio associated with the specific grayscale or the specific grayscale range of the data "DATA" is greater than or equal to the given threshold value, the gamma control logic circuit 160 may generate the tap change signal TCS such that an output of a variable tap gamma amplifier (refer to FIG. 5) is output as a gamma voltage corresponding to the specific grayscale or the specific grayscale range. The gamma voltage generator 150 may perform the tap changing operation in response to the tap change signal TCS. A structure and an operation of the gamma voltage generator 150 according to some implementations of the present disclosure will be described in detail with reference to drawings below.

Figure 5:
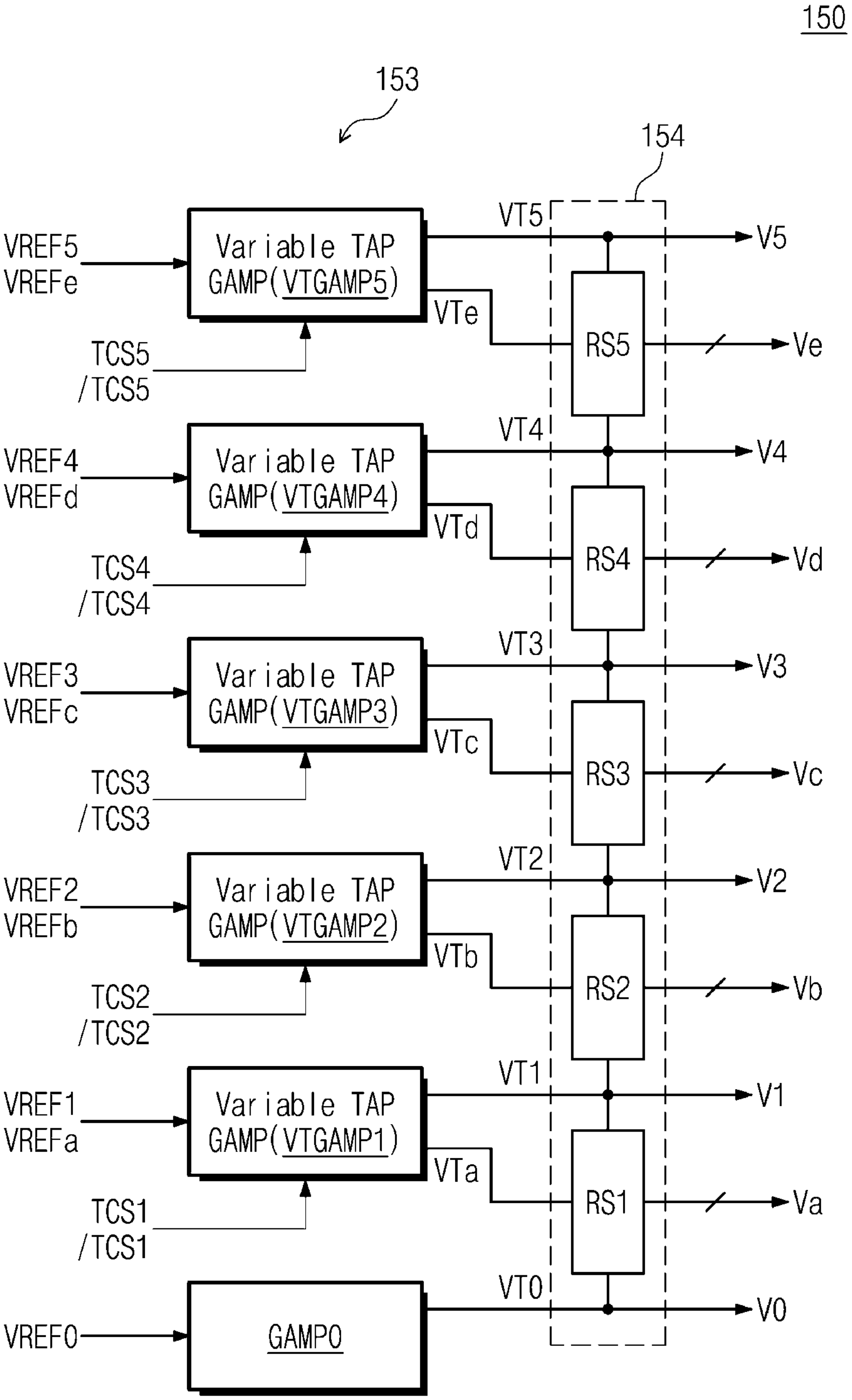
FIG. 5 is a diagram illustrating a gamma voltage generator of FIG. 2, for example, a voltage buffer circuit and a gamma voltage output circuit in detail.
Figure 6:
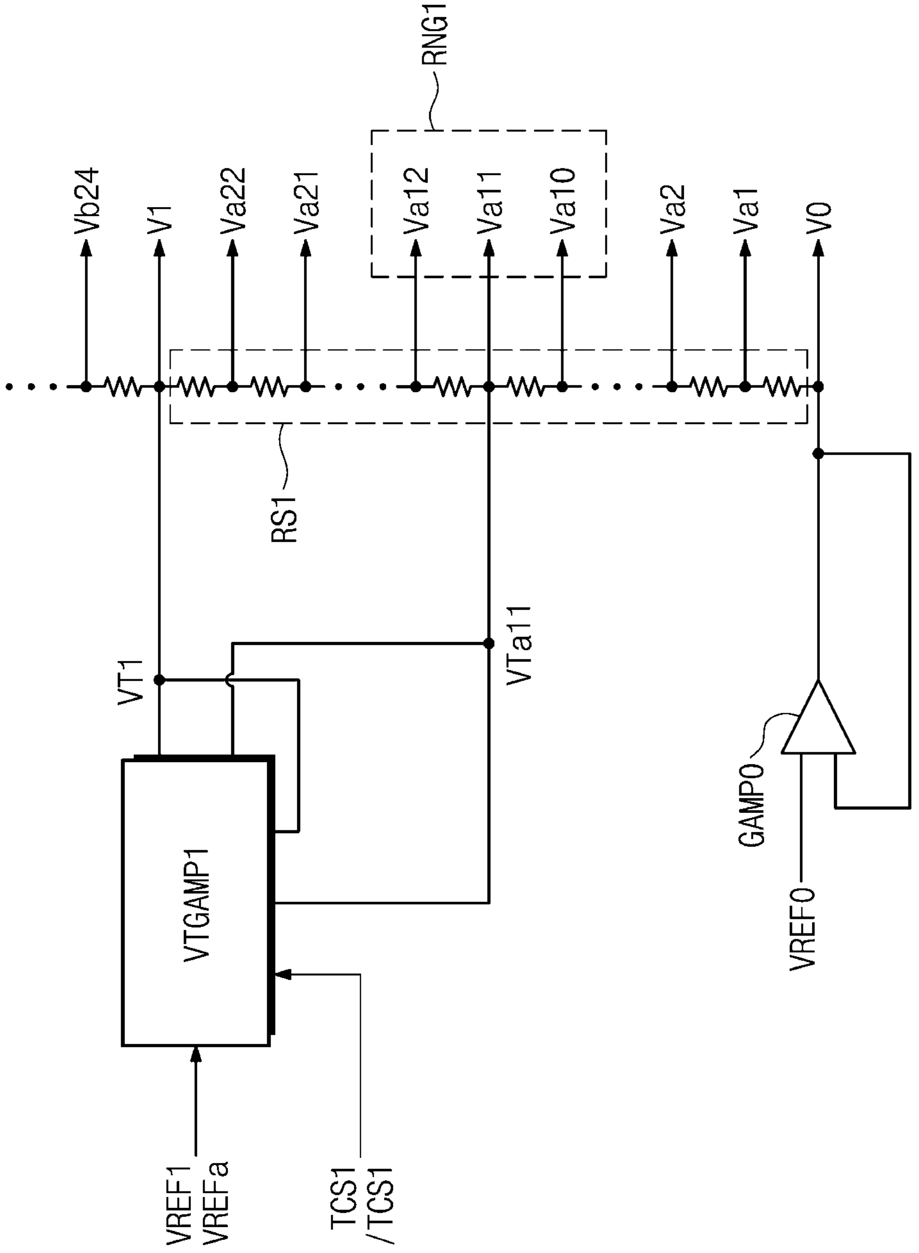
FIG. 6 is a diagram for describing an operation of a first variable tap gamma amplifier of FIG. 5 in detail.

FIG. 5 is a diagram illustrating a gamma voltage generator of FIG. 2, for example, a voltage buffer circuit and a gamma voltage output circuit in detail. FIG. 6 is a diagram for describing an operation of a first variable tap gamma amplifier of FIG. 5 in detail. Referring to FIGS. 1, 2, 5, and 6, the gamma voltage generator 150 may include the voltage buffer circuit 153 and the gamma voltage output circuit 154.

The voltage buffer circuit 153 may include a plurality of gamma amplifiers GAMP0 and VTGAMP1 to VTGAMP5. In some implementations, some of the plurality of gamma amplifiers of FIG. 5 may be implemented with a variable tap gamma amplifier. For example, the gamma amplifier GAMP0 is similar to that described with reference to FIG. 3, and thus, additional description will be omitted to avoid redundancy.

In response to first to fifth tap change signals TCS1 to TCS5 and /TCS1 to/TCS5, the first to fifth variable tap gamma amplifiers VTGAMP1 to VTGAMP5 may output the first to fifth tap voltages VT1 to VT5 or a-th to e-th tap voltages VTa to VTe based on the first to fifth reference voltages VREF1 to VREF5 or a-th to e-th reference voltages VREFa to VREFe. Although this example illustrates each variable tap gamma amplifier receiving a tap change signals TCS and an inversion tap change signal /TCS, the scope of this disclosure is not limited thereto; for example, in some implementations, each variable tap gamma amplifier receives a single signal that controls whether a first to fifth tap voltage VT1 to VT5 or a-th to e-th tap voltage VTa to VTe is output.

For example, the first variable tap gamma amplifier VTGAMP1 may output the first tap voltage VT1 by using the first reference voltage VREF1 in response to the first tap change signals TCS1 and /TCS1. The first variable tap gamma amplifier VTGAMP1 may output the a-th tap voltage VTa by using the a-th reference voltage VREFa in response to the first tap change signals TCS1 and /TCS1. In some implementations, the a-th tap voltage VTa may be output as one of the plurality of a-th gamma voltages Va that are output from the first resistor string RS1.

In detail, as illustrated in FIG. 6, a plurality of gamma voltages V0, Va1 to Va22, and V1 may be output through the first resistor string RS1. In this case, a first output terminal of the first variable tap gamma amplifier VTGAMP1 (e.g., a terminal from which the first tap voltage VT1 is output) may be connected with a terminal from which the first gamma voltage V1 is output, and a second output terminal of the first variable tap gamma amplifier VTGAMP1 (e.g., the a11-th tap voltage VTa11 is output) may be connected with a terminal from which the a11-th gamma voltage Va11 is output.

In this case, the gamma control logic circuit 160 may detect a grayscale ratio of the data "DATA", which corresponds to a first gamma range RNG1. For example, the first gamma range RNG1 may correspond to a range including a medium value (e.g., an intermediate value, an average value, and/or a median value) of the 0-th and first gamma voltages V0 and V1 that are output from the opposite ends of the first resistor string RS1. The first gamma range RNG1 of FIG. 6 may include the a10-th, a11-th, and a12-th gamma voltages Va10, Va11, and Va12, but the present disclosure is not limited thereto. In this case, the gamma control logic circuit 160 may detect the grayscale ratio of data having grayscales corresponding to the a10-th, a11-th, and a12-th gamma voltages Va10, Va11, and Va12.

When the grayscale ratio of the first gamma range RNG1 exceeds a given threshold value, at least some of gamma voltages of the first gamma range RNG1 may fluctuate. For example, in the case where the grayscale of data corresponds to the a11-th gamma voltage Va11, the data driver 130 drives corresponding data lines DL by using the a11-th gamma voltage Va11. That is, in the case where the grayscale of data corresponds to the a11-th gamma voltage Va11, the load of the a11-th gamma voltage Va11 used in the data driver 130 may increase; in this case, the a11-th gamma voltage Va11 may fluctuate.

The gamma control logic circuit can determine that the grayscale ratio of the first gamma range RNG1 exceeds the given threshold value. In response to the grayscale ratio of the first gamma range RNG1 exceeding the given threshold value, the gamma control logic circuit 160 may control or activate the first tap change signals TCS1 and /TCS1. For example, the gamma control logic circuit 160 may control or activate a high TCS1 and a low /TCS1. In this case, the first variable tap gamma amplifier VTGAMP1 outputs the a11-th tap voltage VTa11 based on the a-th reference voltage VREFa (in FIG. 6, the a-th reference voltage VREFa corresponding to the a11-th gamma voltage Va11).

The a11-th tap voltage VTa11 may be directly connected with the a11-th gamma voltage Va11. In other words, the a11-th tap voltage VTa11 may be directly connected with a terminal from which the a11-th gamma voltage Va11 is output (e.g., an internal central terminal of the first resistor string RS1). In this case, because the a11-th gamma voltage Va11 is directly driven or controlled by the first variable tap gamma amplifier VTGAMP1, the fluctuation that occurs at the a11-th gamma voltage Va11 or in the first gamma range RNG1 may be prevented or reduced.

When the grayscale ratio of the first gamma range RNG1 does not exceed the given threshold value, the gamma control logic circuit 160 may control or deactivate the first tap change signals TCS1 and /TCS1 such that the first variable tap gamma amplifier VTGAMP1 outputs the first tap voltage VT1 by using the first reference voltage VREF1.

For convenience of description, the operation of the first variable tap gamma amplifier VTGAMP1 is described in detail with reference to FIG. 6. However, the present disclosure is not limited thereto. For example, the remaining variable tap gamma amplifiers may also be implemented to be similar in operation or structure to the first variable tap gamma amplifier VTGAMP1.

In some implementations, the first to fifth tap change signals TCS1 to TCS5 and /TCS1 to TCS5 may be generated by the gamma control logic circuit 160. For example, in the data "DATA", when the grayscale ratio corresponding to some of the a-th gamma voltages Va is greater than or equal to the given threshold value, the gamma control logic circuit 160 may activate the first tap change signal TCS1 (e.g., so as to be set to an ON level). In this case, as described above, the first variable tap gamma amplifier VTGAMP1 is configured to output the a-th tap voltage VTa in response to the first tap change signals TCS1 and /TCS1. The a-th tap voltage VTa is provided to a corresponding terminal or tap of the first resistor string RS1. In this case, the fluctuations in some of the a-th gamma voltages Va may be reduced or removed.

In the data "DATA", when the grayscale ratio corresponding to some of the b-th gamma voltages Vb is greater than or equal to the given threshold value, the gamma control logic circuit 160 may activate the second tap change signal TCS2 (e.g., so as to be set to an ON level). In this case, the second variable tap gamma amplifier VTGAMP2 is configured to output the b-th tap voltage VTb in response to the second tap change signals TCS2 and /TCS2. The b-th tap voltage VTb is provided to a corresponding terminal or tap of the second resistor string RS2. In this case, the fluctuations in some of the b-th gamma voltages Vb may be reduced or removed.

Likewise, in the data "DATA", when the grayscale ratios corresponding to some of the c-th, d-th, and e-th gamma voltages Vc, Vd, and Ve are greater than or equal to the given threshold value, the gamma control logic circuit 160 may activate the third, fourth, and fifth tap change signals TCS3, TCS4, and TCS5 (e.g., so as to be set to an ON level). In this case, the third to fifth variable tap gamma amplifiers VTGAMP3 to VTGAMP5 are configured to output the c-th to e-th tap voltages VTc to VTe in response to the third to fifth tap change signals TCS3, TCS4, and TCS5. The c-th to e-th tap voltages VTc to VTe are provided to corresponding terminals or taps of the third to fifth resistor strings RS3 to RS5. In this case, the fluctuations in some of the c-th to e-th gamma voltages Vc, Vd, and Ve may be reduced or removed.

As described above, the gamma voltage generator 150 may include a variable tap gamma amplifier configured to change an output voltage in response to a tap change signal. In this case, with regard to one channel data "DATA", the gamma control logic circuit 160 may detect a grayscale ratio for each gamma range and may determine whether a grayscale ratio being greater than or equal to the given threshold value exists. When a grayscale ratio of a specific gamma range exceeds the given threshold value, the gamma control logic circuit 160 may generate the tap change signal such that at least one of gamma voltages included in the specific gamma range is driven or controlled by an output of a corresponding variable tap gamma amplifier. As such, the voltage fluctuations of the specific gamma range may be reduced or prevented.

When the variable tap gamma amplifier described above is used, the total number of gamma amplifiers for generating gamma voltages may decrease. Alternatively, or in addition, because a specific gamma voltage is directly driven or controlled by the variable tap gamma amplifier depending on a specific condition, the overall performance of the display device may be improved.

Figure 7:
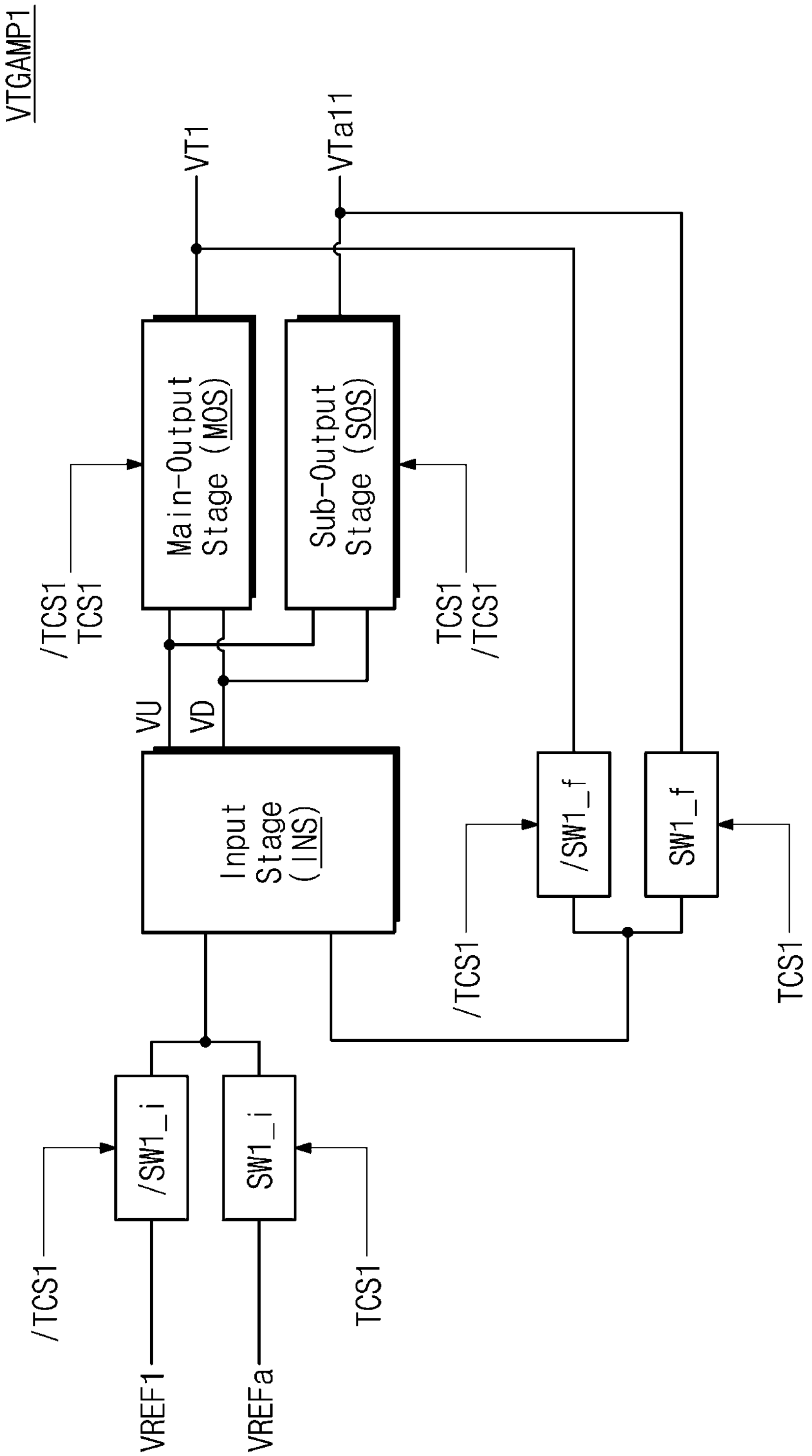
FIG. 7 is a block diagram illustrating a first variable tap gamma amplifier of FIG. 6.

FIG. 7 is a block diagram illustrating a first variable tap gamma amplifier of FIG. 6. Referring to FIGS. 1, 6, and 7, the first variable tap gamma amplifier VTGAMP1 may include an input stage INS, a main-output stage MOS, a sub-output stage SOS, and a plurality of switches SW1_*i*, /SW1_*i*, SW1_*f*, and /SW1_*f*.

Below, for convenience of description, it is assumed that the first variable tap gamma amplifier VTGAMP1 outputs the a11-th tap voltage VTa11 when the first tap change signals TCS1 and /TCS1 are activated (e.g., when the first tap change signal TCS1 is at the high level and the first inversion tap change signal /TCS1 is at the low level) and outputs the first tap voltage VT1 when the first tap change signals TCS1 and /TCS1 are deactivated (e.g., when the first tap change signal TCS1 is at the low level and the first inversion tap change signal /TCS1 is at the high level). However, the present disclosure is not limited thereto.

The first input switches SW1_*i* and /SW1_*i* may provide one of the first or a-th reference voltages VREF1 and VREFa to a non-inverting input terminal of the input stage INS in response to the first tap change signals TCS1 and /TCS1. For example, when the first tap change signals TCS1 and /TCS1 are deactivated, the first input switch SW1_*i* may be turned off, and the first inversion input switch /SW1_*i* may be turned on, the first reference voltage VREF1 may be provided to the input stage INS. In contrast, when the first tap change signals TCS1 and /TCS1 are activated, the first input switch SW1_*i* may be turned on, and the first inversion input switch /SW1_*i* may be turned off, the a-th reference voltage VREFa may be provided to the input stage INS.

The first feedback switches SW1_*f* and /SW1_*f* may provide one of the first or a 11-th tap voltages VT1 and VTa11 (e.g., an output of the first variable tap gamma amplifier VTGAMP1) to an inverting input terminal of the input stage INS in response to the first tap change signals TCS1 and /TCS1. For example, when the first tap change signals TCS1 and /TCS1 are deactivated, the first feedback switch SW1_*f* may be turned off, and the first inversion feedback switch /SW1_*f* may be turned on, the first tap voltage VT1 may be provided to the input stage INS. In contrast, when the first tap change signals TCS1 and /TCS1 are activated, the first feedback switch SW1_*i* may be turned on, and the first inversion feedback switch /SW1_*i* may be turned off, the al l-th gamma voltage Va11 may be provided to the input stage INS.

The input stage INS may generate a pull-up voltage VU and a pull-down voltage VD based on the received voltages (e.g., the first reference voltage VREF1 and the first tap voltage VT1 or the a-th reference voltage VREFa and the a11-th tap voltage VTa11). For example, when the voltage (e.g., one of the first reference voltage VREF1 or the a-th reference voltage VREFa) input to the non-inverting input terminal of the input stage INS is greater than the voltage (e.g., one of the first tap voltage VT1 or the a11-th tap voltage VTa11) input to the inverting input terminal of the input stage INS, the pull-up voltage VU and the pull-down voltage VD are generated such that the output voltage (e.g., one of the first tap voltage VT1 and the a11-th tap voltage VTa11) increases. For example, when the voltage (e.g., one of the first reference voltage VREF1 or the a-th reference voltage VREFa) input to the non-inverting input terminal of the input stage INS is smaller than the voltage (e.g., one of the first tap voltage VT1 or the a11-th tap voltage VTa11) input to the inverting input terminal of the input stage INS, the pull-up voltage VU and the pull-down voltage VD are generated such that the output voltage (e.g., one of the first tap voltage VT1 or the a11-th tap voltage VTa11) decreases.

The pull-up voltage VU and the pull-down voltage VD are provided to the main-output stage MOS and the sub-output stage SOS. The main-output stage MOS and the sub-output stage SOS may respectively output the first tap voltage VT1 and the a11-th tap voltage VTa11 based on the pull-up voltage VU and the pull-down voltage VD.

In some implementations, the main-output stage MOS and the sub-output stage SOS may operate in response to the first tap change signals TCS1 and /TCS1. For example, when the first tap change signals TCS1 and /TCS1 are deactivated, only the first tap voltage VT1 may be output through the main-output stage MOS, and the sub-output stage SOS may not operate. In contrast, when the first tap change signals TCS1 and /TCS1 are activated, only the a11-th tap voltage VTa11 may be output through the sub-output stage SOS, and the main-output stage MOS may not operate.

Figure 8:
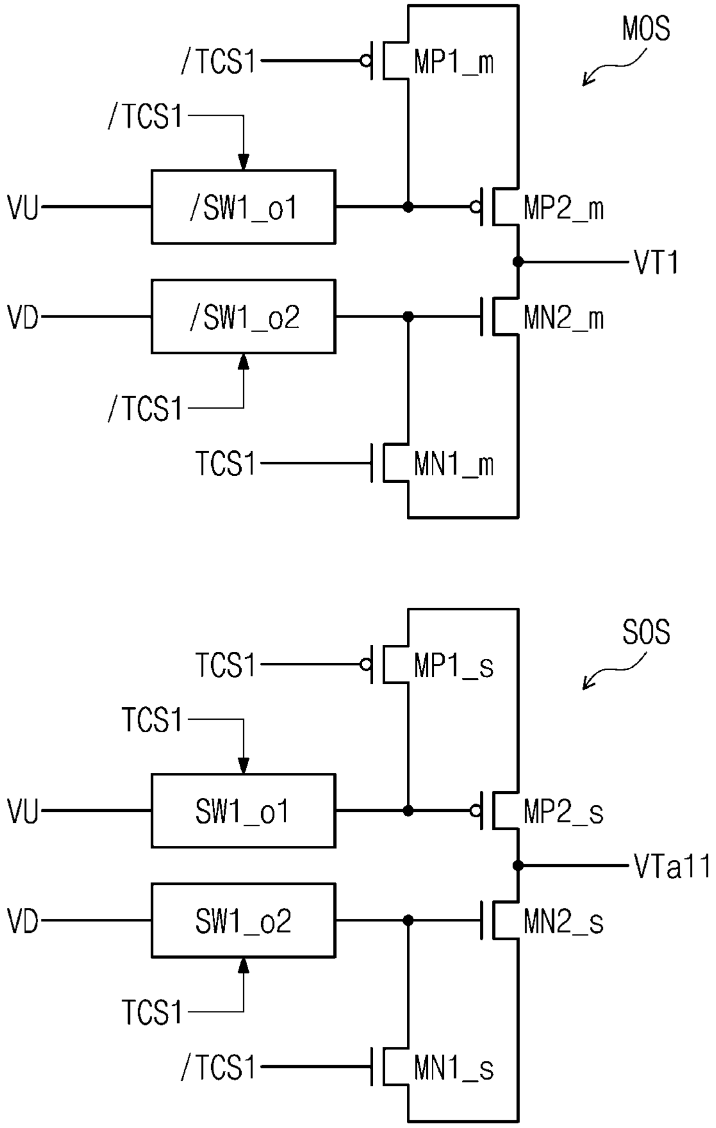
FIG. 8 is a circuit diagram illustrating a main-output stage and a sub-output stage of a first variable tap gamma amplifier of FIG. 7.

FIG. 8 is a circuit diagram illustrating a main-output stage and a sub-output stage of a first variable tap gamma amplifier of FIG. 7. For convenience of description, some components of the main-output stage MOS and the sub-output stage SOS of the first variable tap gamma amplifier VTGAMP1 are illustrated, but the present disclosure is not limited thereto. Although some transistors are described as particular types of transistor (e.g., PMOS transistors), output stages including other types of transistors, in other configurations, are also within the scope of this disclosure.

Referring to FIGS. 7 and 8, the main-output stage MOS may include first and second inversion output switches /SW1_*o*1 and /SW_o2 and a plurality of transistors MP1_*m*, MP2_*m*, MN1_*m*, and MN2_*m*. The first inversion output switch /SW1_*o*1 may be connected between the pull-up voltage VU and a gate of the second main PMOS transistor MP2_*m* and may operate in response to the first inversion tap change signal /TCS1. The second inversion output switch /SW1_*o*2 may be connected between the pull-down voltage VD and a gate of the second main NMOS transistor MN2_*m* and may operate in response to the first inversion tap change signal /TCS1.

The first main PMOS transistor MP1_*m* may be connected between the power supply voltage and a gate of the second main PMOS transistor MP2_*m* and may operate in response to the first inversion tap change signal /TCS1. The first main NMOS transistor MN1_*m* may be connected between the ground voltage and a gate of the second main NMOS transistor MN2_*m* and may operate in response to the first tap change signal TCS1. The second main PMOS transistor MP2_*m* may be connected between the power supply voltage and the output terminal (e.g., the terminal from which the first tap voltage VT1 is output) and may operate in response to a voltage on one end of the first inversion output switch /SW1_*o*1 or one end of the first main PMOS transistor MP1_*m*. The second main NMOS transistor MN2_*m* may be connected between the output terminal (e.g., the terminal from which the first tap voltage VT1 is output) and the ground voltage and may operate in response to a voltage on one end of the second inversion output switch /SW1_*o*2 or one end of the first main NMOS transistor MN1_*m*.

The sub-output stage SOS may include first and second output switches SW1_*o*1 and SW_o2 and a plurality of transistors MP1_*s*, MP2_*s*, MN1_*s*, and MN2_*s*. The first output switch SW1_*o*1 may be connected between the pull-up voltage VU and a gate of the second sub-PMOS transistor MP2_*s* and may operate in response to the first tap change signal TCS1. The second output switch SW1_*o*2 may be connected between the pull-down voltage VD and a gate of the second sub-NMOS transistor MN2_*s* and may operate in response to the first tap change signal TCS1.

The first sub-PMOS transistor MP1_*s* may be connected between the power supply voltage and a gate of the second sub-PMOS transistor MP2_*s* and may operate in response to the first tap change signal TCS1. The first sub-NMOS transistor MN1_*s* may be connected between the ground voltage and a gate of the second sub-NMOS transistor MN2_*s* and may operate in response to the first inversion tap change signal /TCS1. The second sub-PMOS transistor MP2_*s* may be connected between the power supply voltage and the output terminal (e.g., the terminal from which the a11-th tap voltage VTa11 is output) and may operate in response to a voltage on one end of the first output switch SW1_*o*1 or one end of the first sub-PMOS transistor MP1_*s*. The second sub-NMOS transistor MN2_*s* may be connected between the output terminal (e.g., the terminal from which the a11-th tap voltage VTa11 is output) and the ground voltage and may operate in response to a voltage on one end of the second output switch SW1_*o*2 or one end of the first sub-NMOS transistor MN1_*s*.

According to the structure described with reference to FIGS. 7 and 8, when the first tap change signals TCS1 and /TCS1 are deactivated (e.g., when the first tap change signal TCS1 is at the low level and the first inversion tap change signal /TCS1 is at the high level), the pull-up voltage VU and the pull-down voltage VD output from the input stage INS may be voltages that are based on the first reference voltage VREF1 and the first tap voltage VT1. In this case, in the main-output stage MOS, the inversion output switches /SW1_*o*1 and /SW1_*o*2 may be turned on, and the first main PMOS transistor MP1_*m* and the first main NMOS transistor MN1_*m* may be turned off. As such, the second main PMOS transistor MP2_*m* may operate (or may be turned on) in response to the pull-up voltage VU, and the second main NMOS transistor MN2_*m* may operate (or may be turned on) in response to the pull-down voltage VD; in this case, the first tap voltage VT1 may be output or controlled.

Also, when the first tap change signals TCS1 and /TCS1 are deactivated (e.g., when the first tap change signal TCS1 is at the low level and the first inversion tap change signal /TCS1 is at the high level), in the sub-output stage SOS, the output switches SW1_*o*1 and SW_o2 may be turned off, and the first sub-PMOS transistor MP1_*s* and the first sub-NMOS transistor MN1_*s* may be turned on. As such, the second sub-PMOS transistor MP2_*s* and the second sub-NMOS transistor MN2_*s* may be turned off, and the terminal outputting the a11-th gamma voltage Va11 may be floated. That is, the sub-output stage SOS may not operate.

In contrast, when the first tap change signals TCS1 and /TCS1 are activated (e.g., when the first tap change signal TCS1 is at the high level and the first inversion tap change signal /TCS1 is at the low level), the pull-up voltage VU and the pull-down voltage VD output from the input stage INS may be voltages that are based on the a-th reference voltage VREFa and the a11-th tap voltage VTa11. In this case, in the sub-output stage SOS, the output switches SW1_*o*1 and SW1_*o*2 may be turned on, and the first sub-PMOS transistor MP1_*s* and the first sub-NMOS transistor MN1_*s* may be turned off. As such, the second sub-PMOS transistor MP2_*s* may operate (or may be turned on) in response to the pull-up voltage VU, and the second sub-NMOS transistor MN2_*s* may operate (or may be turned on) in response to the pull-down voltage VD; in this case, the a11-th tap voltage VTa11 may be output or controlled.

Also, when the first tap change signals TCS1 and /TCS1 are activated (e.g., when the first tap change signal TCS1 is at the high level and the first inversion tap change signal /TCS1 is at the low level), in the main-output stage MOS, the inversion output switches /SW1_*o*1 and /SW_o2 may be turned off, and the first main PMOS transistor MP1_*m* and the first main NMOS transistor MN1_*m* may be turned on. As such, the second main PMOS transistor MP2_*m* and the second main NMOS transistor MN2_*m* may be turned off, and the terminal outputting the first tap voltage VT1 may be floated. That is, the main-output stage MOS may not operate.

As described above, the first variable tap gamma amplifier VTGAMP1 may configured to output the first tap voltage VT1 or the a11-th tap voltage VTa11 in response to the first tap change signals TCS1 and /TCS1.

The above structure and operation of the first variable tap gamma amplifier VTGAMP1 are provided as an example, and the present disclosure is not limited thereto. For example, the first variable tap gamma amplifier VTGAMP1 may be variously changed or modified such that the first tap voltage VT1 or the a11-th tap voltage VTa11 is output in response to the first tap change signals TCS1 and /TCS1.

FIGS. 9 to 13 are timing diagrams for describing an operation of a gamma control logic circuit of FIG. 1. For convenience of description, FIGS. 9 to 13 illustrate examples in which one data (e.g., DT1, DT2, or DT3) are updated every period of the horizontal synchronization signal HSYNC. In this case, it is assumed that data updated every period of the horizontal synchronization signal HSYNC indicate data corresponding to one color channel. However, the present disclosure is not limited thereto. For example, pieces of data associated with a plurality of color channels may be updated every period of the horizontal synchronization signal HSYNC.

Figure 9:
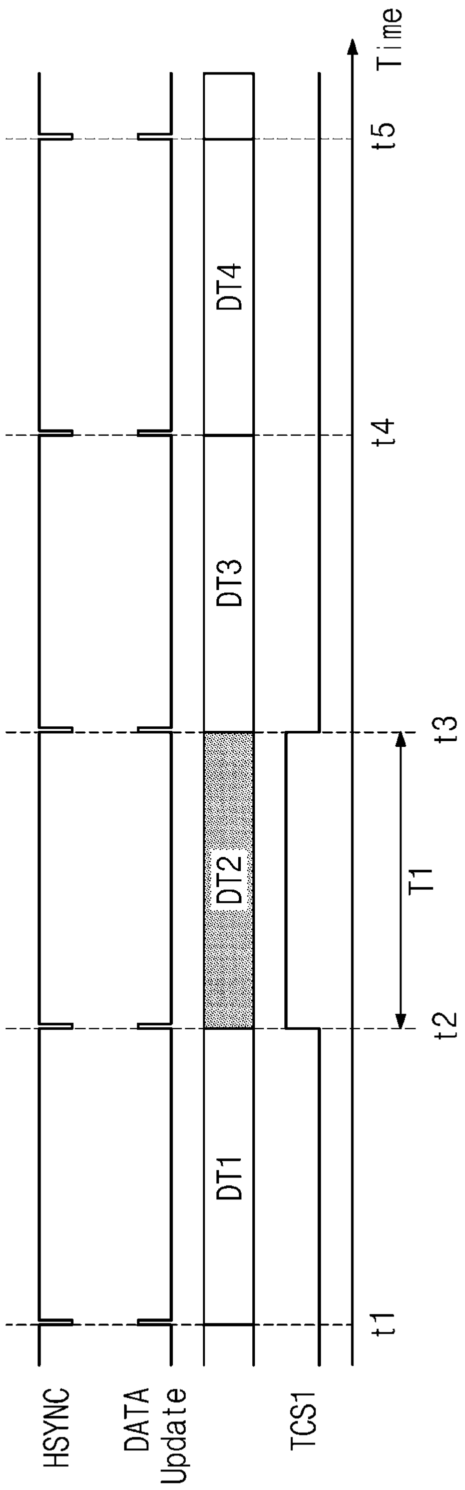
FIGS. 9 to 13 are timing diagrams for describing an operation of a gamma control logic circuit of FIG. 1.

Referring to FIGS. 1 and 9, the horizontal synchronization signal HSYNC may toggle at each of first, second, third, fourth, and fifth times t1, t2, t3, t4, and t5. The channel data "DATA" may be updated in the data driver 130 in synchronization with the toggling of the horizontal synchronization signal HSYNC. For example, the first data DT1 may be updated in the data driver 130 at the first time t1; the second data DT2 may be updated in the data driver 130 at the second time t2; the third data DT3 may be updated in the data driver 130 at the third time t3; and, the fourth data DT4 may be updated in the data driver 130 at the fourth time t4.

During a time period from t1 to t2, the data driver 130 controls the data lines DL by using the plurality of gamma voltages V[m:0] such that an image corresponding to the first data DT1 is displayed through a first row of the display panel 110. During a time period from t2 to t3, the data driver 130 controls the data lines DL by using the plurality of gamma voltages V[m:0] such that an image corresponding to the second data DT2 is displayed through a second row of the display panel 110. During a time period from t3 to t4, the data driver 130 controls the data lines DL by using the plurality of gamma voltages V[m:0] such that an image corresponding to the third data DT3 is displayed through a third row of the display panel 110. During a time period from t4 to t5, the data driver 130 controls the data lines DL by using the plurality of gamma voltages V[m:0] such that an image corresponding to the fourth data DT4 is displayed through a fourth row of the display panel 110.

In this case, the gamma control logic circuit 160 may detect a grayscale ratio for each gamma range, in each of the data DT1, DT2, DT3, and DT4. When a grayscale ratio exceeding the given threshold value is present in the detected grayscale ratios, the gamma control logic circuit 160 may generate a tap change signal such that an output of a variable tap gamma amplifier is directly provided to the corresponding gamma range. For example, as illustrated in FIG. 9, in the second data DT2, the grayscale ratio of the first gamma range RNG1 (refer to FIG. 6) may be greater than or equal to the given threshold value. In this case, the gamma control logic circuit 160 may activate the first tap change signal TCS1 such that the output of the first variable tap gamma amplifier VTGAMP1 is directly provided as the gamma voltage corresponding to the first gamma range RNG1. During a time period T1 where the first tap change signal TCS1 is activated, the first variable tap gamma amplifier VTGAMP1 may output the a11-th tap voltage VTa11 instead of the first tap voltage VT1, and the a11-th tap voltage VTa11 may be directly provided as one of gamma voltages included in the first gamma range RNG1. In this case, because the gamma voltage corresponding to the relatively high grayscale ratio is directly provided from the variable tap gamma amplifier, the fluctuations in the gamma voltage corresponding to the relatively high grayscale ratio may be reduced or prevented.

In some implementations, the given threshold value associated with the grayscale ratio of data of one color channel may be ½ or ⅔ of the number of data of one color channel. However, the present disclosure is not limited thereto.

Figure 10:
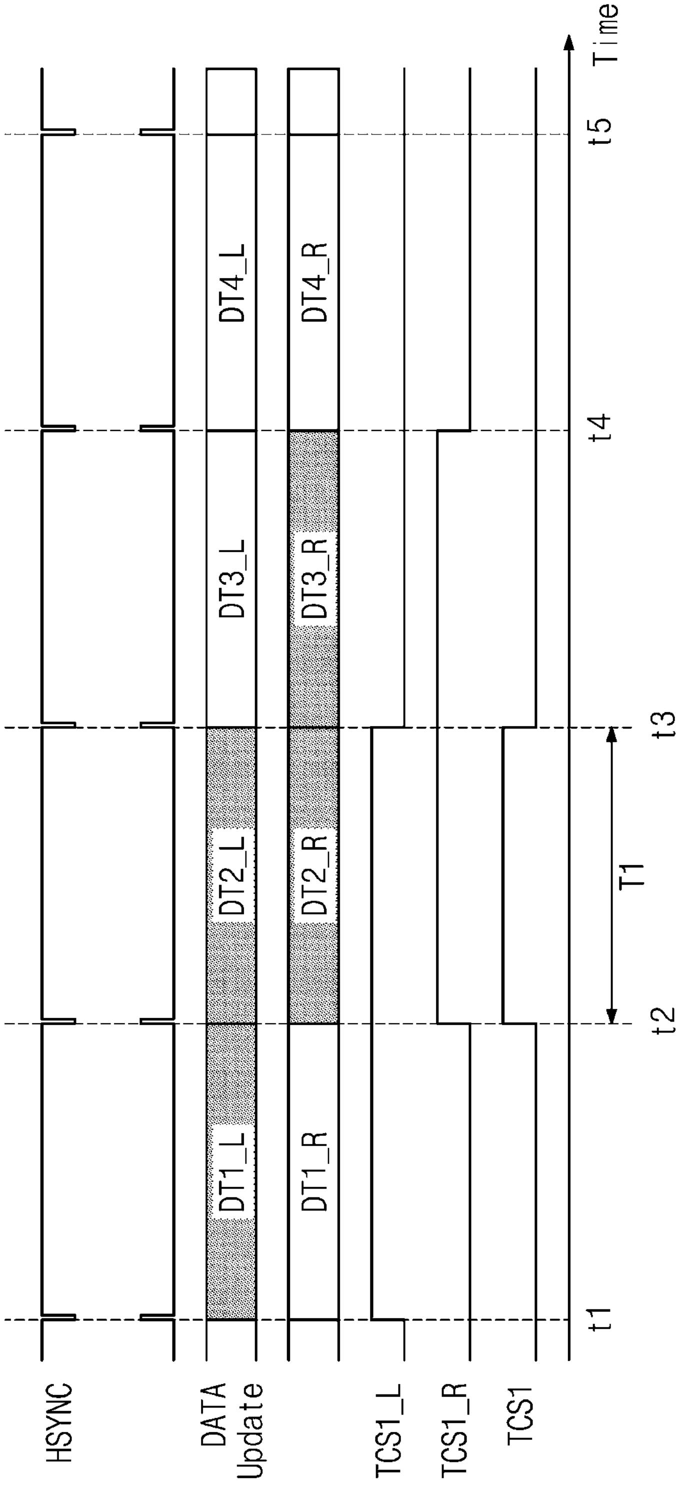

Referring to FIGS. 1 and 10, in some implementations, the horizontal synchronization signal HSYNC may toggle at each of the first, second, third, fourth, and fifth times t1, t2, t3, t4, and t5. The channel data "DATA" may be updated in the data driver 130 in synchronization with the toggling of the horizontal synchronization signal HSYNC. In this case, unlike the description given with reference to FIG. 9, in the implementation of FIG. 10, data that are updated every period of the horizontal synchronization signal HSYNC may be divided into 2 or more data.

For example, in FIG. 10, the first data DT1 may be divided into first left data DT1_L and first right data DT1_R. The first left data DT1_L may indicate data corresponding to pixels placed on the left with respect to the center of the display panel 110, and the first right data DT1_R may indicate data corresponding to pixels placed on the right with respect to the center of the display panel 110. In some implementations, the data driver 130 may include a plurality of source driver units; some of the plurality of source driver units may drive data lines corresponding to the pixels placed on the left with respect to the center of the display panel 110, and the others thereof may drive data lines corresponding to the pixels placed on the right with respect to the center of the display panel 110. That is, some of the plurality of source driver units may drive some of the data lines DL based on the first left data DT1_L, and the others thereof may drive the others of the data lines DL based on the first right data DT1_R.

As in the above description, at the second time t2, second left data DT2_L and second right data DT2_R may be updated in the data driver 130; at the third time t3, third left data DT3_L and third right data DT3_R may be updated in the data driver 130; at the fourth time t4, fourth left data DT4_L and fourth right data DT4_R may be updated in the data driver 130.

At a time when data are updated, the gamma control logic circuit 160 may detect the grayscale ratio for each of the left data and the right data. For example, as illustrated in FIG. 10, in each of the left data DT1_L, DT2_L, DT3_L, and DT4_L, a first left tap change signal TCS1_L may be generated based on whether a grayscale ratio associated with the first gamma range RNG1 (refer to FIG. 6) exceeds the given threshold value; in each of the right data DT1_R, DT2_R, DT3_R, and DT4_R, a first right tap change signal TCS1_R may be generated based on whether a grayscale ratio associated with the first gamma range RNG1 (refer to FIG. 6) exceeds the given threshold value.

In detail, in the first and second left data DT1_L and DT2_L, the grayscale ratio associated with the first gamma range RNG1 may exceeds the given threshold value; in the second and third right data DT2_R and DT3_R, the grayscale ratio associated with the first gamma range RNG1 may exceeds the given threshold value. In this case, the first left tap change signal TCS1_L generated by the gamma control logic circuit 160 may be activated from t1 to t3, that is, during a time period where the first and second left data DT1_L and DT2_L are output; the first right tap change signal TCS1_R generated by the gamma control logic circuit 160 may be activated from t2 to t4, that is, during a time period where the second and third right data DT2_R and DT3_R are output.

In this case, the gamma control logic circuit 160 may activate the first tap change signal TCS1 during the first time period T1 where both the first left tap change signal TCS1_L and the first right tap change signal TCS1_R are activated.

Figure 11:
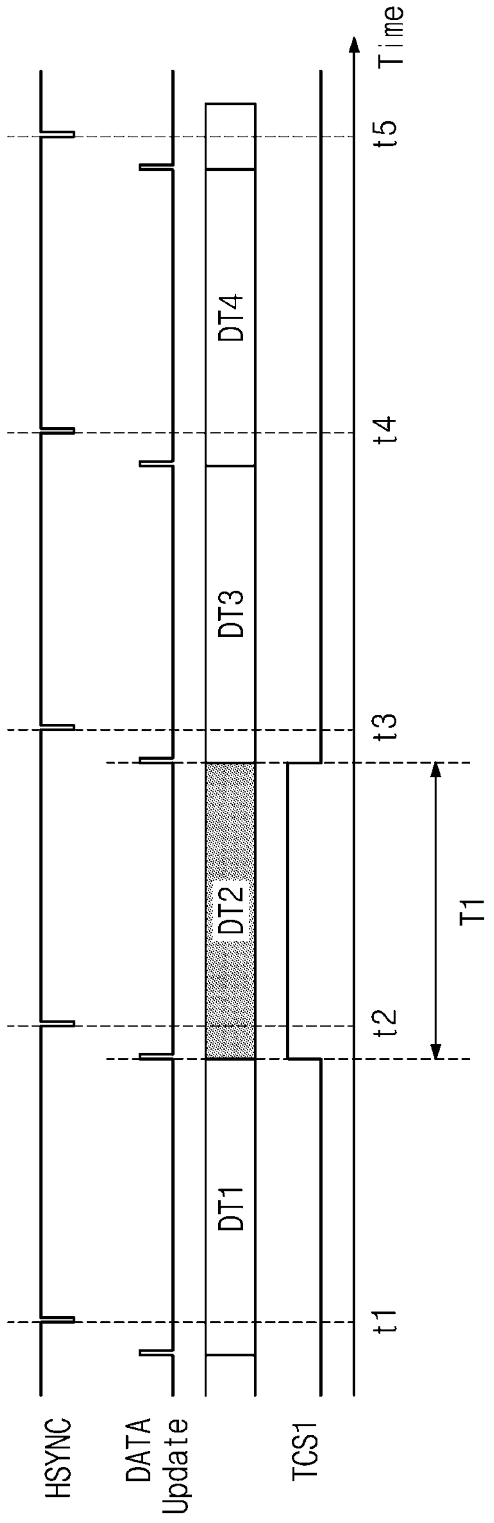

Referring to FIGS. 1 and 11, the horizontal synchronization signal HSYNC may toggle at each of the first, second, third, fourth, and fifth times t1, t2, t3, t4, and t5. In the implementation of FIG. 11, the display device 100 may operate in a specific mode (e.g., an S-latch mode). In this case, the data DT1, DT2, DT3, and DT4 may be updated in the data driver 130 to be earlier than the toggling of the horizontal synchronization signal HSYNC. The implementation of FIG. 11 is substantially similar to the implementation of FIG. 9 except that the update time points of the data DT1, DT2, DT3, and DT4 are different, and thus, additional description associated with the thereto will be omitted to avoid redundancy.

Figure 12:
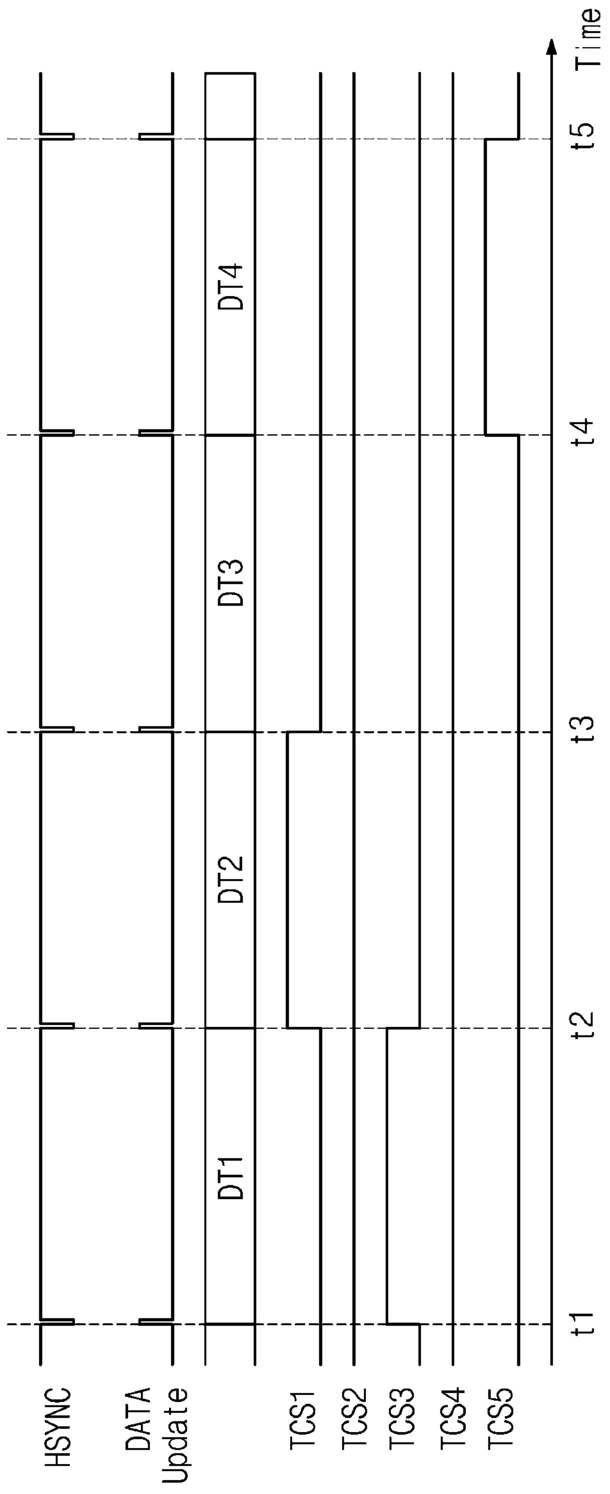

Referring to FIG. 12, the horizontal synchronization signal HSYNC may toggle at each of the first, second, third, fourth, and fifth times t1, t2, t3, t4, and t5, and the data DT1, DT2, DT3, and DT4 may be updated in synchronization with the toggling of the horizontal synchronization signal HSYNC.

In the implementations described above, the gamma control logic circuit 160 detects a grayscale ratio associated with the first gamma range RNG1 and controls the first tap change signal TCS1 based on the detected grayscale ratio. However, the present disclosure is not limited thereto. In one period of the horizontal synchronization signal HSYNC, the gamma control logic circuit 160 may be configured to detect grayscale ranges respectively associated with a plurality of gamma ranges of data and to control a plurality of tap change signals.

For example, as illustrated in FIG. 12, in the first data DT1, the grayscale ratio associated with a third gamma range (e.g., some of the c-th gamma voltages Vc of FIG. 5) may be greater than or equal to the given threshold value. In this case, the gamma control logic circuit 160 may activate the third tap change signal TCS3 during a time period from t1 to t2. During the time period from t1 to t2, in response to the third tap change signal TCS3, the third variable tap gamma amplifier VTGAMP3 may output the c-th tap voltage VTc instead of the third tap voltage VT3, and the c-th tap voltage VTc may be provided to a corresponding terminal of the third resistor string RS3. That is, the third variable tap gamma amplifier VTGAMP3 may perform the tap changing operation in response to the third tap change signal TCS3.

In the second data DT2, the grayscale ratio associated with the first gamma range RNG1 (e.g., some of the a-th gamma voltages Va of FIG. 5 or the RNG1 of FIG. 6) may be greater than or equal to the given threshold value; in this case, the gamma control logic circuit 160 may activate the first tap change signal TCS1 during a time period from t2 to t3. The first variable tap gamma amplifier VTGAMP1 may perform the tap changing operation in response to the first tap change signal TCS1.

In the third data DT3, there may be no gamma range having a grayscale ratio greater than or equal to the given threshold value; in this case, all the tap change signals TCS1 to TCS5 may be deactivated. In the fourth data DT4, the grayscale ratio associated with a fifth gamma range (e.g., some of the e-th gamma voltages Ve of FIG. 5) may be greater than or equal to the given threshold value; in this case, the gamma control logic circuit 160 may activate the fifth tap change signal TCS5 during a time period from t4 to t5. The fifth variable tap gamma amplifier VTGAMP5 may perform the tap changing operation in response to the fifth tap change signal TCS5. In some implementations, multiple tap change signals may be activated during a same time period.

Figure 13:
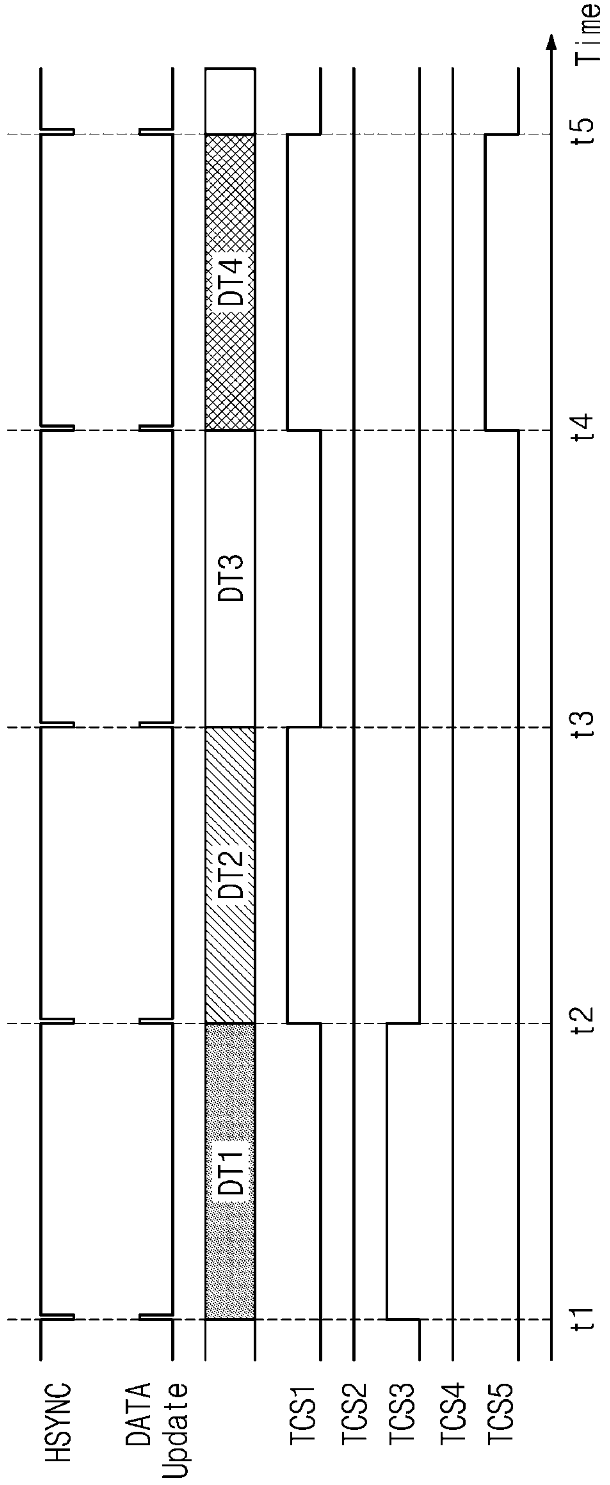

Referring to FIG. 13, the horizontal synchronization signal HSYNC may toggle at each of the first, second, third, fourth, and fifth times t1, t2, t3, t4, and t5, and the data DT1, DT2, DT3, and DT4 may be updated in synchronization with the toggling of the horizontal synchronization signal HSYNC.

In some implementations described above, the gamma control logic circuit 160 is configured to activate one tap change signal every period of the horizontal synchronization signal HSYNC. However, the present disclosure is not limited thereto. For example, as illustrated in FIG. 13, in the first data DT1, a grayscale ratio of a third gamma range may be greater than or equal to the given threshold value; in this case, the third tap change signal TCS3 may be activated. In the second data DT2, a grayscale ratio of a first gamma range may be greater than or equal to the given threshold value; in this case, the first tap change signal TCS1 may be activated.

Afterwards, in the third data DT3, there may be no grayscale ratio greater than or equal to the given threshold value; in this case, all the tap change signals TCS1 to TCS5 may be deactivated.

Afterwards, in the fourth data DT4, there may be no grayscale ratio greater than or equal to the given threshold value. However, a pattern of the fourth data DT4 may satisfy a specific condition; in this case, the gamma control logic circuit 160 may activate the first and fifth tap change signals TCS1 and TCS5. For example, the specific condition may include the condition where the fourth data DT4 uses only gamma voltages included in the first gamma range and the fifth gamma range. In this case, because the data driver 130 controls the data lines DL only by using the gamma voltages of the first gamma range and the fifth gamma range, two tap change signals (e.g., TCS1 and TCS5) may be activated, and thus, the fluctuations in the gamma voltages of the first and fifth gamma ranges may be reduced or prevented.

As described above, the gamma control logic circuit 160 may determine grayscale ratios of data corresponding to one row or one line and may generate tap change signals based on a determination result. In this case, depending on whether the determination result satisfies various specific conditions, the gamma control logic circuit 160 may selectively activate one or more of tap change signals.

In some implementations, the specific condition may include one or more of the following conditions.

As an example, in data of one color channel, when a grayscale ratio of a specific gamma range is greater than or equal to the given threshold value, a tap change signal corresponding to the specific gamma range may be activated. For example, when a grayscale ratio of some of the a-th gamma voltages Va is greater than or equal to the given threshold value, the first tap change signal TCS1 may be activated.

As another example, in data of one color channel, a tap change signal that corresponds to a gamma range having the highest grayscale ratio may be activated. In this case, a grayscale ratio of a tap voltage output from the main-output stage of the variable tap gamma amplifier corresponding to the activated tap change signal may be smaller than or equal to a reference value. For example, in FIG. 5, when a grayscale ratio of some of the b-th gamma voltages Vb is the highest but is smaller than or equal to the reference value and a grayscale ratio of the second gamma voltage V2 is smaller than or equal to the reference value, the second tap change signal TCS2 may be activated. In this case, because the use ratio of the second gamma voltage V2 corresponding to the second tap voltage VT2 output from the second variable tap gamma amplifier VTGAMP2 is relatively low, the fluctuations in the second gamma voltage V2 may be relatively small. Accordingly, even though the second variable tap gamma amplifier VTGAMP2 outputs the b-th tap voltage VTb, all the gamma voltages may be stably provided.

As another example, in data of one color channel, when there exist only grayscale ratios associated with some of gamma ranges, tap change signals corresponding to the some gamma ranges may be activated. For example, in the case where data of one color data are only associated with some of the a-th gamma voltages Va and some of the e-th gamma voltages Ve, the first and fifth tap change signals TCS1 and TCS5 may be activated.

The above conditions associated with the activation of the tap change signals are provided as an example, and the present disclosure is not limited thereto.

FIG. 14 is a diagram illustrating an example of a main-output, a sub-output, and a gamma range associated with a gamma voltage generator of FIG. 1. In some implementations, an image or data may be expressed through the display panel 110 by using 256 grayscale levels. In this case, 256 gamma voltages V0 to V255 may be output from the gamma voltage generator 150.

The 0-th gamma voltage V0 may be controlled or driven by the 0-th gamma amplifier GAMP0. The first gamma voltage V1 may be controlled or driven by the first gamma amplifier GAMP1. The fifteenth gamma voltage V15 may be controlled or driven by the second gamma amplifier GAMP2. The second to fourteenth gamma voltages V2 to V14 may be generated by a resistor string between the first gamma voltage V1 and the fifteenth gamma voltage V15.

The 39th, 63rd, 87th, 111st, 135th, 159th, 183rd, 207th, 231st, and 255th gamma voltages V39, V63, V87, V111, V135, V159, V183, V207, V231, and V255 may be respectively controlled or driven by the third to twelfth variable tap gamma amplifiers VTGAMP3 to VTGAMP12. The remaining gamma voltages may be generated by resistor strings connected between the 39th, 63rd, 87th, 111st, 135th, 159th, 183rd, 207th, 231st, and 255th gamma voltages V39, V63, V87, V111, V135, V159, V183, V207, V231, and V255.

The third to twelfth variable tap gamma amplifiers VTGAMP3 to VTGAMP12 may be configured to control or drive the 27th, 51st, 75th, 99th, 123rd, 147th, 171st, 195th, 219th, and 243th gamma voltages V27, V51, V75, V99, V123, V147, V171, V195, V219, and V243 in response to the corresponding tap change signals.

In this case, the tap change signals respectively corresponding to the third to twelfth variable tap gamma amplifiers VTGAMP3 to VTGAMP12 may be activated or controlled by the gamma control logic circuit 160, based on the third gamma range of the tap voltages V23 to V31, the fourth gamma range of the tap voltages V47 to V55, the fifth gamma range of the tap voltages V71 to V79, the sixth gamma range of the tap voltages V95 to V103, the seventh gamma range of the tap voltages V119 to V127, the eighth gamma range of the tap voltages V143 to V151, the ninth gamma range of the tap voltages V167 to V175, the tenth gamma range of the tap voltages V191 to V199, the eleventh gamma range of the tap voltages V215 to V223, and the twelfth gamma range of the tap voltages V239 to V247. The implementation and numerical values illustrated in FIG. 14 are provided only as an example, and the present disclosure is not limited thereto.

Figure 15:
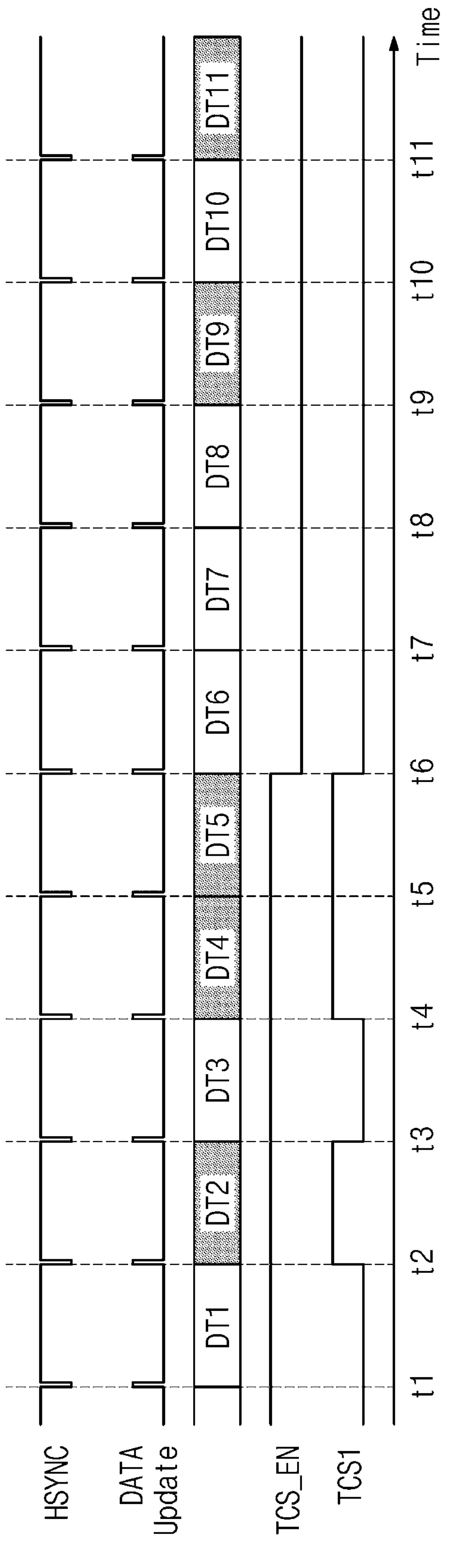
FIG. 15 is a diagram for describing an operation of a gamma control logic circuit of FIG. 1.

FIG. 15 is a diagram for describing an operation of a gamma control logic circuit of FIG. 1. For convenience of description, additional description associated with the components described above will be omitted to avoid redundancy.

Referring to FIGS. 1 and 15, the horizontal synchronization signal HSYNC may toggle at each of first to eleventh times t1 to tn. A plurality of data DT1 to DT11 may be updated in synchronization with the period of the horizontal synchronization signal HSYNC. In this case, it is assumed that, in each of the second, fourth, fifth, ninth, and eleventh data DT2, DT4, DT5, DT9, and DT11, a grayscale ratio associated with a first gamma range is greater than or equal to the given threshold value.

In some of the above-described implementations, during the duration of each of the second, fourth, fifth, ninth, and eleventh data DT2, DT4, DT5, DT9, and DT11, the first tap change signal TCS1 may be activated. In the implementation of FIG. 15, the gamma control logic circuit 160 may activate the first tap change signal TCS1 in response to a tap change enable signal TCS_EN. For example, as illustrated in FIG. 15, the tap change enable signal TCS_EN may be activated during a time period from t1 to t6. During the time period t1 to t7 where the tap change enable signal TCS_EN is activated, the first tap change signal TCS1 may be selectively activated. In contrast, during a time period t7 to t11 where the tap change enable signal TCS_EN is deactivated, even in the case where a grayscale ratio of a specific gamma range is greater than or equal to the given threshold value, the first tap change signal TCS1 may not be activated, e.g., the tap change signal TCS1 may be withheld. That is, the gamma control logic circuit 160 may perform the tap changing operation in response to the tap change enable signal TCS_EN.

Figure 16:
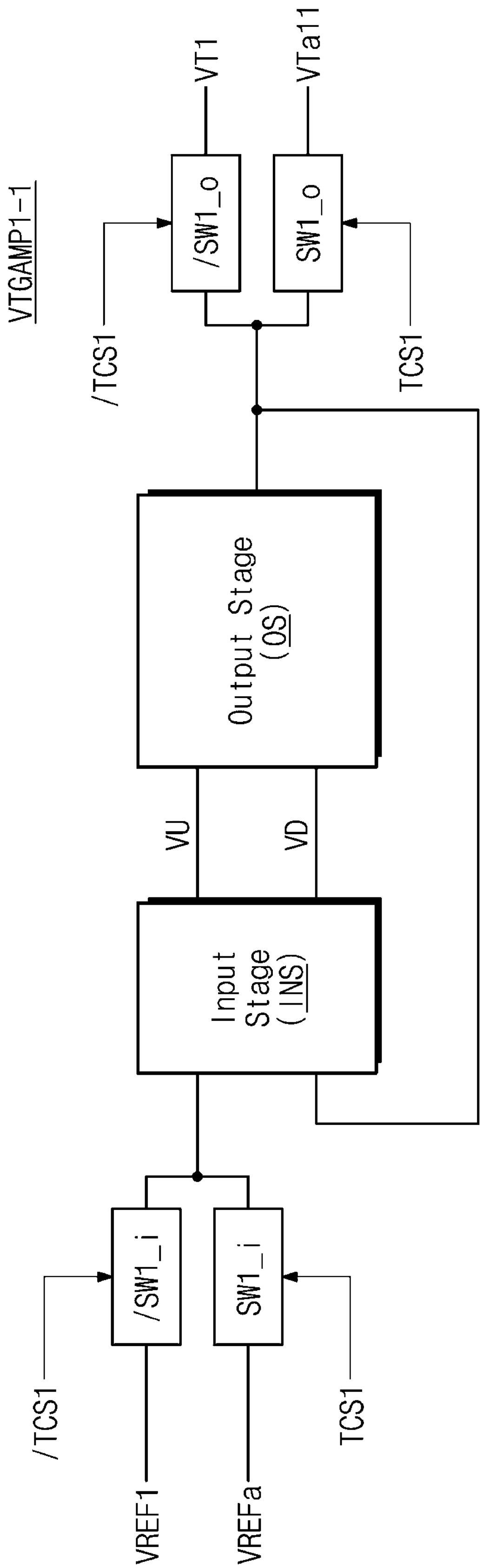
FIG. 16 is a block diagram illustrating a first variable tap gamma amplifier of FIG. 6.

FIG. 16 is a block diagram illustrating another example of a first variable tap gamma amplifier of FIG. 6. In some implementations, a first variable tap gamma amplifier VTGAMP1-1 of FIG. 16 may be used as the first variable tap gamma amplifier VTGAMP1 of FIG. 6.

Referring to FIGS. 6 and 16, the first variable tap gamma amplifier VTGAMP1-1 may include input switches SW1_*i* and /SW1_*i*, an input stage INS, an output stage OS, and output switches SW1_*o* and /SW1_*o*. Operations of the input switches SW1_*i* and /SW1_*i* are similar to those described with reference to FIG. 7, and thus, additional description will be omitted to avoid redundancy.

The input stage INS may compare a voltage (e.g., one of the first reference voltage VREF1 and the a-th reference voltage VREFa) provided through the input switches SW1_*i* and /SW1_*i* with an output voltage of the output stage OS to output the pull-up voltage VU and the pull-down voltage VD. The output stage OS may generate the output voltage based on the pull-up voltage VU and the pull-down voltage VD.

The output switch SW1_*o* may output the output of the output stage OS as the a11-th tap voltage VTa11 in response to the first tap change signal TCS1. The inversion output switch /SW1_*o* may output the output of the output stage OS as the first tap voltage VT1 in response to the first inversion tap change signal /TCS1.

In the structure of the first variable tap gamma amplifier VTGAMP1-1 of FIG. 16, when the first tap change signals TCS1 and /TCS1 are deactivated (e.g., the first tap change signal TCS1 is at the low level and the first inversion tap change signal /TCS1 is at the high level), the first reference voltage VREF1 may be applied to the input stage INS, and the output of the output stage OS may be output as the first tap voltage VT1. In contrast, when the first tap change signals TCS1 and /TCS1 are activated (e.g., when the first tap change signal TCS1 is at the high level and the first inversion tap change signal /TCS1 is at the low level), the a-th reference voltage VREFa may be applied to the input stage INS, and the output of the output stage OS may be output as the a 11-th tap voltage VTa11.

That is, the first variable tap gamma amplifier VTGAMP1-1 may be configured to drive or control the first tap voltage VT1 or to drive or control the a11-th tap voltage VTa11 in response to the first tap change signals TCS1 and /TCS1.

Figure 17:
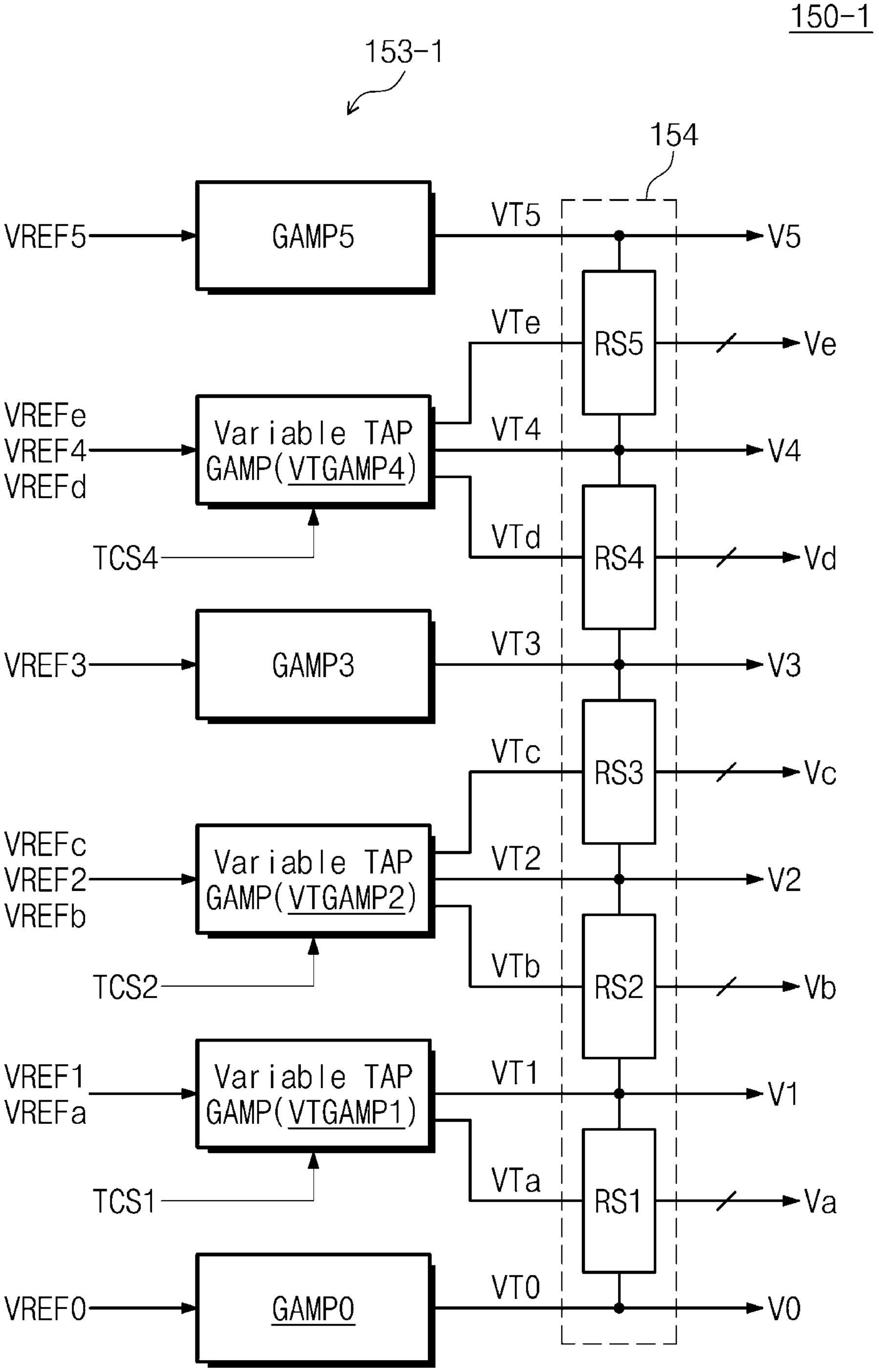
FIG. 17 is a diagram illustrating a gamma voltage generator of FIG. 2, for example, a voltage buffer circuit and a gamma voltage output circuit in detail.

FIG. 17 is a diagram illustrating another example of a gamma voltage generator of FIG. 2, for example, a voltage buffer circuit and a gamma voltage output circuit in detail. Referring to FIGS. 2 and 17, a gamma voltage generator 150-1 may include a voltage buffer circuit 153-1 and the gamma voltage output circuit 154.

The voltage buffer circuit 153-1 may include a plurality of gamma amplifiers GAMP0, VTGAMP1, VTGAMP2, GAMP3, VTGAMP4, and GAMP5. Each of some (e.g., GAMP0, GAMP3, and GAMP5) of the plurality of gamma amplifiers GAMP0, VTGAMP1, VTGAMP2, GAMP3, VTGAMP4, and GAMP5 may be an amplifier configured to output a specific tap voltage, and each of the remaining gamma amplifiers (e.g., VTGAMP1, VTGAMP2, and VTGAMP4) may be configured to output a specific tap voltage or a changed tap voltage.

For example, the 0-th gamma amplifier GAMP0 may output the 0-th tap voltage VT0 by using the 0-th reference voltage VREF0, and the 0-th tap voltage VT0 may be output as the 0-th gamma voltage V0.

The first variable tap gamma amplifier VTGAMP1 may output the first tap voltage VT1 by using the first reference voltage VREF1, and the first tap voltage VT1 may be output as the first gamma voltage V1. The first variable tap gamma amplifier VTGAMP1 may output the a-th tap voltage VTa by using the a-th reference voltage VREFa in response to a first tap change signal TCS1, and the a-th tap voltage VTa may be output as one of the a-th gamma voltages Va.

The second variable tap gamma amplifier VTGAMP2 may output the second tap voltage VT2 by using the second reference voltage VREF2, and the second tap voltage VT2 may be output as the second gamma voltage V2. The second variable tap gamma amplifier VTGAMP2 may output the b-th tap voltage VTb by using the b-th reference voltage VREFb in response to the second tap change signal TCS2, and the b-th tap voltage VTb may be output as one of the b-th gamma voltages Vb. The second variable tap gamma amplifier VTGAMP2 may output the c-th tap voltage VTc by using the c-th reference voltage VREFc in response to the second tap change signal TCS2, and the c-th tap voltage VTc may be output as one of the c-th gamma voltages Vc.

That is, the second variable tap gamma amplifier VTGAMP2 may be configured to output one of the second tap voltage VT2, the b-th tap voltage VTb, or the c-th tap voltage VTc. In this case, the second variable tap gamma amplifier VTGAMP2 may further include the sub-output stage SOS described with reference to FIG. 7 or may further include output switches described with reference to FIG. 16. In this case, the second tap change signal TCS2 may be implemented in the form of a bit stream such that one of the second tap voltage VT2, the b-th tap voltage VTb, or the c-th tap voltage VTc is selected.

The third gamma amplifier GAMP3 may output the third tap voltage VT3 by using the third reference voltage VREF3, and the third tap voltage VT3 may be output as the third gamma voltage V3.

The fourth variable tap gamma amplifier VTGAMP4 may output the fourth tap voltage VT4 by using the fourth reference voltage VREF4, and the fourth tap voltage VT4 may be output as the fourth gamma voltage V4. The fourth variable tap gamma amplifier VTGAMP4 may output the d-th tap voltage VTd by using the d-th reference voltage VREFd or the e-th tap voltage VTe by using the e-th reference voltage VREFe in response to the fourth tap change signal TCS4, the d-th tap voltage VTd may be output as one of the d-th gamma voltages Vd, and the e-th tap voltage VTe may be output as one of the e-th gamma voltages Ve. A structure and an operation of the fourth variable tap gamma amplifier VTGAMP4 are similar to those of the second variable tap gamma amplifier VTGAMP2 except that reference voltages and tap voltages are different, and thus, additional description will be omitted to avoid redundancy.

The fifth gamma amplifier GAMP5 may output the fifth tap voltage VT5 by using the fifth reference voltage VREF5, and the fifth tap voltage VT5 may be output as the fifth gamma voltage V5.

As described above, a variable tap gamma amplifier may be configured to change a tap voltage in response to a tap change signal. In this case, the tap change signal may be selectively activated based on a grayscale ratio of data detected by the gamma control logic circuit 160. How to activate the tap change signal is described above, and thus, additional description will be omitted to avoid redundancy.

Figure 18:
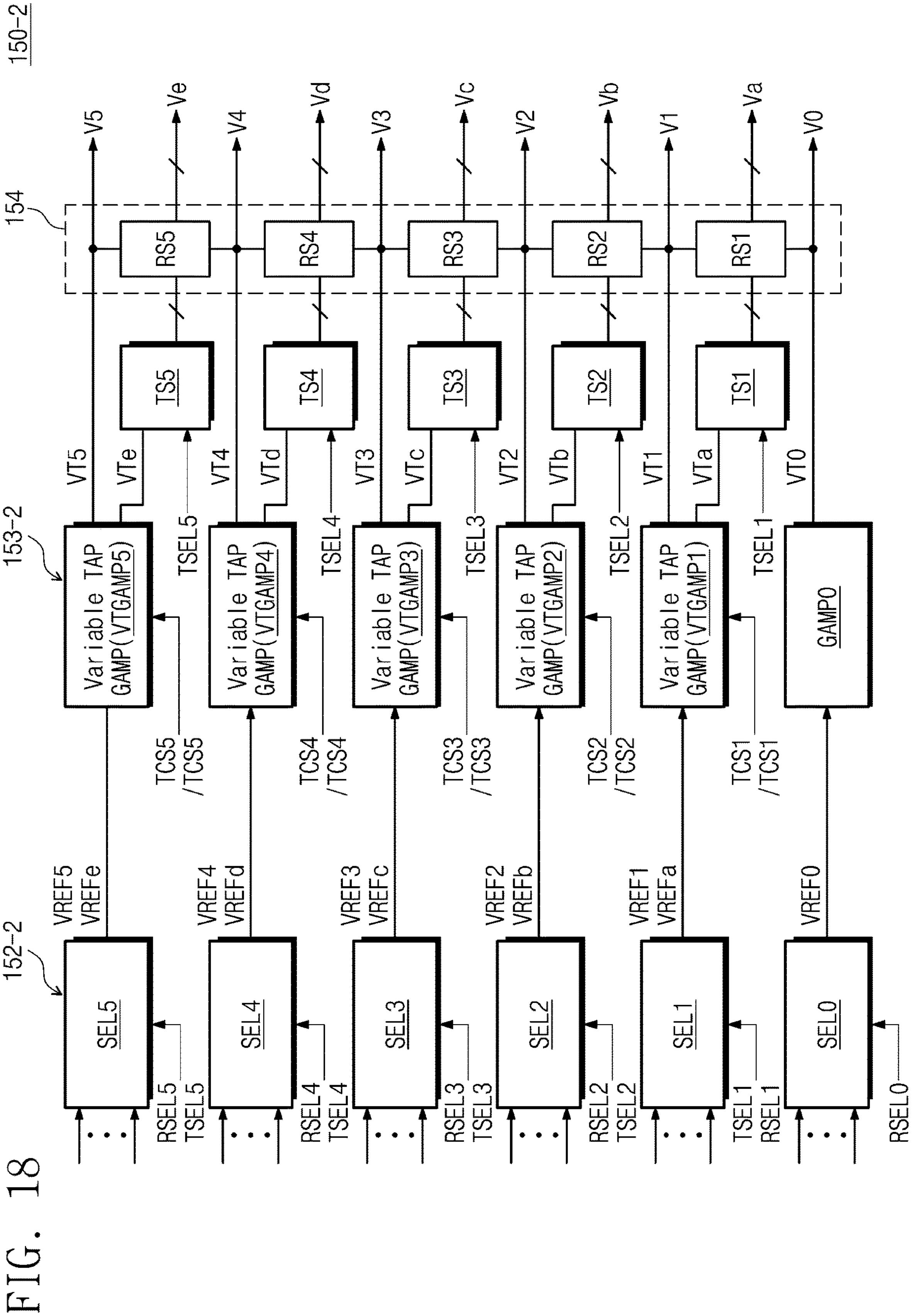
FIG. 18 is a diagram illustrating a gamma voltage generator of FIG. 2, for example, a reference voltage selecting circuit, a voltage buffer circuit, and a gamma voltage output circuit in detail.

FIG. 18 is a diagram illustrating another example of a gamma voltage generator of FIG. 2, for example, a reference voltage selecting circuit, a voltage buffer circuit, and a gamma voltage output circuit in detail. Referring to FIGS. 2 and 18, a gamma voltage generator 150-2 may include a reference voltage selecting circuit 152-2, a voltage buffer circuit 153-2, and the gamma voltage output circuit 154.

The reference voltage selecting circuit 152-2 may include a plurality of selectors SEL0 to SEL5. The voltage buffer circuit 153-2 may include a plurality of gamma amplifiers GAMP0 and VTGAMP1 to VTGAMP5 and a plurality of tap selectors (tap selector circuits) TS1 to TS5. The gamma voltage output circuit 154 may include the plurality of resistor string RS1 to RS5.

The 0-th selector SEL0 may output one of the plurality of reference voltages REF[k:0] generated from the reference voltage generating circuit 151 as the 0-th reference voltage VREF0 in response to a 0-th reference voltage selection signal RSEL0.

The 0-th gamma amplifiers GAMP0 may output the 0-th tap voltage VT0 by using the 0-th reference voltage VREF0, and the 0-th tap voltage VT0 may be output as the 0-th gamma voltage V0.

The first selector SELL may output one of the plurality of reference voltages REF[k:0] generated from the reference voltage generating circuit 151 as the first reference voltage VREF1 in response to a first reference voltage selection signal RSEL1. The first selector SELL may output one of the plurality of reference voltages REF[k:0] generated from the reference voltage generating circuit 151 as the a-th reference voltage VREFa in response to a first tap selection signal TSEL1.

The first variable tap gamma amplifier VTGAMP1 may output the first tap voltage VT1 by using the first reference voltage VREF1. The first tap voltage VT1 may be connected with one end of the first resistor string RS1 and may be output as the first gamma voltage V1. The first variable tap gamma amplifier VTGAMP1 may output the a-th tap voltage VTa by using the a-th reference voltage VREFa in response to the first tap change signals TCS1 and /TCS1. The a-th tap voltage VTa may be provided to the first tap selector TS1. The first tap selector TS1 may provide the a-th tap voltage VTa to a specific terminal in the first resistor string RS1 in response to the first tap selection signal TSEL1. For example, the first tap selector TS1 may be configured to provide VTa to a selectable terminal in the first resistor string RS1, where the selected terminal can be selected based on TSEL1 input into the first tap selector TS1. The tap selectors may be circuit devices.

In some implementations, the first tap selection signal TSEL1 may be generated by the gamma control logic circuit 160. For example, the gamma control logic circuit 160 may determine a grayscale ratio corresponding to each gamma voltage, in the data "DATA" of one row or one line. In this case, when a grayscale ratio of one of the a-th gamma voltages Va exceeds the given threshold value or when the specific condition described above is satisfied with regard to one of the a-th gamma voltages Va, the gamma control logic circuit 160 may generate the first tap selection signal TSEL1 such that the output of the first variable tap gamma amplifier VTGAMP1 is directly provided as the one of the a-th gamma voltages Va.

In detail, it is assumed that a grayscale ratio corresponding to an a5-th gamma voltage among gamma voltages output from the first resistor string RS1 is greater than or equal to the given threshold value. In this case, the gamma control logic circuit 160 generates the first tap selection signal TSEL1 such that the a-th tap voltage VTa output from the first variable tap gamma amplifier VTGAMP1 corresponds to the a5-th gamma voltage. In response to the first tap selection signal TSEL1, the first tap selector TS1 may connect the a-th tap voltage VTa with a terminal or tap of the first resistor string RS1, from which the a5-th gamma voltage is output.

The second to fifth selectors SEL2 to SEL5 may output corresponding voltages of the plurality of reference voltages REF[k:0] generated from the reference voltage generating circuit 151 as the second to fifth reference voltages VREF2 to VREF5 in response to second to fifth reference voltage selection signals RSEL2 to RSEL5. The second to fifth selectors SEL2 to SEL5 may output corresponding voltages of the plurality of reference voltages REF[k:0] as the b-th to e-th reference voltages VREFb to VREFe in response to second to fifth tap selection signals TSEL2 to TSEL5.

The second to fifth variable tap gamma amplifiers VTGAMP2 to VTGAMP5 may respectively generate the second to fifth tap voltages VT2 to VT5 by using the second to fifth reference voltages VREF2 to VREF5. The second to fifth tap voltages VT2 to VT5 may be respectively output as the second to fifth gamma voltages V2 to V5.

The second to fifth variable tap gamma amplifiers VTGAMP2 to VTGAMP5 may generate the b-th to e-th tap voltages VTb to VTe by using the b-th to e-th reference voltages VREFb to VREFe in response to the second to fifth tap change signals TCS2 to TCS5 and /TCS2 to/TCS5. The second to fifth tap selectors TS2 to TS5 may provide the b-th to e-th tap voltages VTb to VTe to the second to fifth resistor strings RS2 to RS5 in response to the second to fifth tap selection signals TSEL2 to TSEL5. The b-th tap voltage VTb may be output as one of the b-th gamma voltages Vb through the second resistor string RS2; the c-th tap voltage VTc may be output as one of the c-th gamma voltages Vc through the third resistor string RS3; the d-th tap voltage VTd may be output as one of the d-th gamma voltages Vd through the fourth resistor string RS4; the e-th tap voltage VTe may be output as one of the e-th gamma voltages Ve through the fifth resistor string RS5.

The second to fifth selectors SEL2 to SEL5, the second to fifth variable tap gamma amplifiers VTGAMP2 to VTGAMP5, and the second to fifth tap selectors TS2 to TS5 are similar to the first selector SEL1, the first variable tap gamma amplifier VTGAMP1, and the first tap selector TS1, and thus, additional description will be omitted to avoid redundancy.

Figure 19:
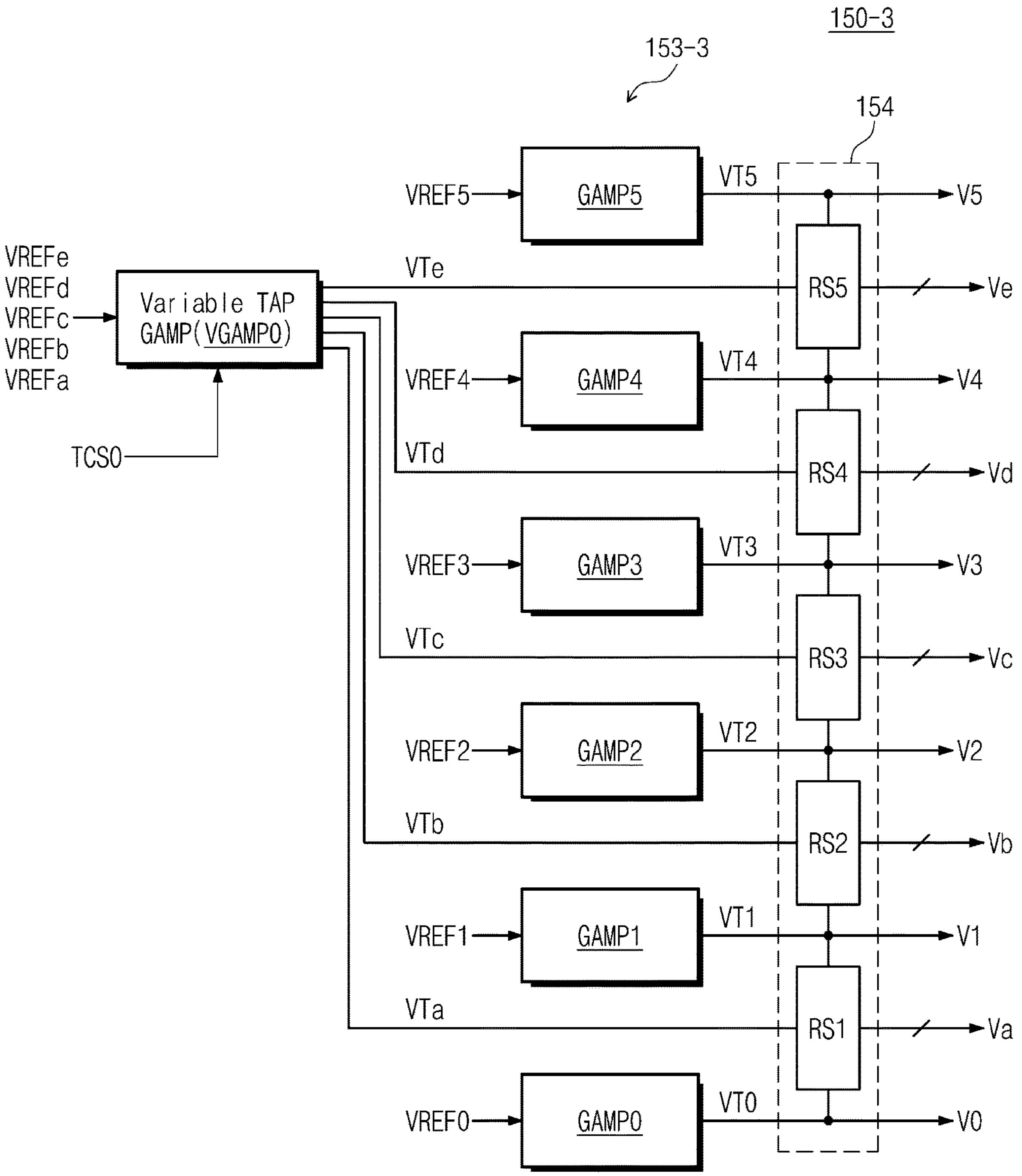
FIG. 19 is a diagram illustrating a gamma voltage generator of FIG. 2, for example, a voltage buffer circuit and a gamma voltage output circuit in detail.

FIG. 19 is a diagram illustrating another example of a gamma voltage generator of FIG. 2, for example, a voltage buffer circuit and a gamma voltage output circuit in detail. Referring to FIGS. 2 and 19, a voltage buffer circuit 153-3 may include a plurality of gamma amplifiers GAMP0 to GAMP5 and VTGAMP0. The gamma voltage output circuit 154 may include the plurality of resistor string RS1 to RS5.

The 0-th to fifth gamma amplifiers GAMP0 to GAMP5 may respectively output the 0-th to fifth tap voltages VT0 to VT5 by using the 0-th to fifth reference voltages VREF0 to VREF5. The 0-th to fifth tap voltages VT0 to VT5 may be respectively output as the 0-th to fifth gamma voltages V0 to V5 by the gamma voltage output circuit 154.

The 0-th variable tap gamma amplifier VTGAMP0 may output one of the a-th to e-th tap voltages VTa to VTe by using one of the a-th to e-th reference voltages VREFa to VREFe in response to a 0-th tap change signal TCS0. The a-th to e-th tap voltages VTa to VTe output from the 0-th variable tap gamma amplifier VTGAMP0. The a-th tap voltage VTa may be output as one of the a-th gamma voltages Va through the first resistor string RS1; the b-th tap voltage VTb may be output as one of the b-th gamma voltages Vb through the second resistor string RS2; the c-th tap voltage VTc may be output as one of the c-th gamma voltages Vc through the third resistor string RS3; the d-th tap voltage VTd may be output as one of the d-th gamma voltages Vd through the fourth resistor string RS4; and, the e-th tap voltage VTe may be output as one of the e-th gamma voltages Ve through the fifth resistor string RS5.

That is, the 0-th variable tap gamma amplifier VTGAMP0 may be configured to provide a specific tap voltage corresponding to a specific gamma voltage in response to the 0-th tap change signal TCS0. In some implementations, when the specific gamma voltage satisfies at least one of various conditions described above or another condition, the 0-th tap change signal TCS0 may be generated by the gamma control logic circuit 160 such that the 0-th variable tap gamma amplifier VTGAMP0 outputs the tap voltage corresponding to the specific gamma voltage.

In some implementations, although not illustrated in drawing, each of the tap voltages VTa to VTe output from the 0-th variable tap gamma amplifier VTGAMP0 may be provided to the corresponding resistor string among the plurality of resistor string RS1 to RS5 or to the corresponding terminal through the separate tap selector.

The above configuration of the gamma voltage generator or the numbers of voltages and signals described above are provided as an example, and the present disclosure is not limited thereto.

Figure 20:
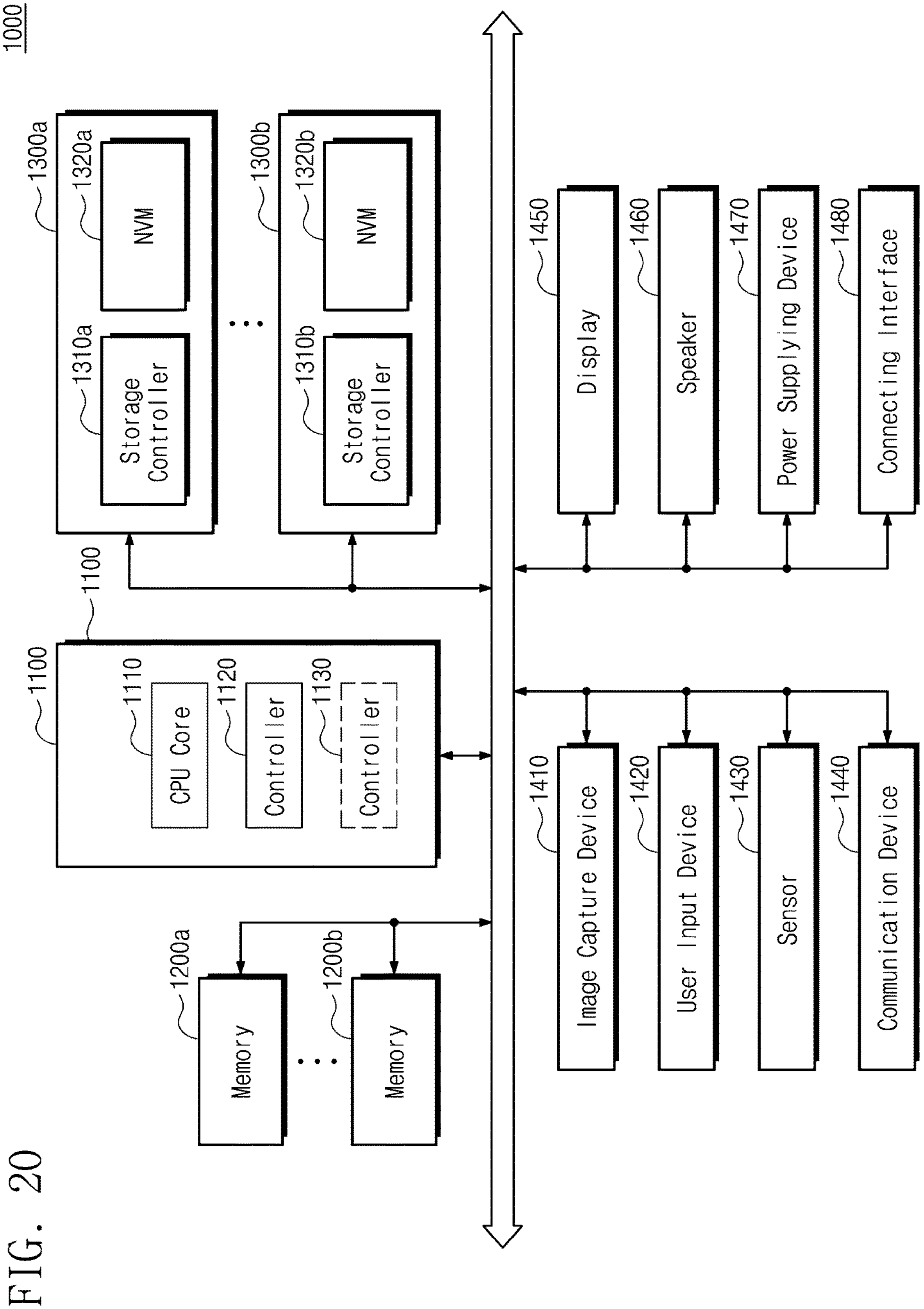
FIG. 20 is a diagram illustrating a system according to some implementations of the present disclosure.

FIG. 20 is a diagram of a system 1000 to which a storage device is applied, according to some implementations. The system 1000 of FIG. 20 may be a mobile system, such as a portable communication terminal (e.g., a mobile phone), a smartphone, a tablet personal computer (PC), a wearable device, a healthcare device, or an Internet of things (JOT) device. However, the system 1000 of FIG. 20 is not necessarily limited to the mobile system and may be a PC, a laptop computer, a server, a media player, or an automotive device (e.g., a navigation device), or another device.

Referring to FIG. 20, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some implementations, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVM (Non-Volatile Memory)s 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In some implementations, the display 1450 may be the display device described with reference to FIGS. 1 to 19 or may operate based on the method described with reference to FIGS. 1 to 19.

According to the present disclosure, a variable tap gamma amplifier with improved performance, a gamma voltage generator including the variable tap gamma amplifier, and a display driving integrated circuit including the gamma voltage generator are provided.

While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. A gamma voltage generation circuit comprising:

a first resistor string connected between a 0-th terminal and a first terminal, and configured to output first gamma voltages;

a first variable tap gamma amplifier configured to output a first tap voltage to the first terminal using a first reference voltage; and a gamma control logic circuit configured to selectively activate a first tap change signal based on a first grayscale ratio of first line data, wherein the first variable tap gamma amplifier is configured to output a second tap voltage to a first intermediate terminal of the first resistor string using a second reference voltage in response to activation of the first tap change signal.

2. The gamma voltage generation circuit of claim 1, wherein the second tap voltage is an intermediate gamma voltage having a value between the first tap voltage and a 0-th tap voltage output to the 0-th terminal.

3. The gamma voltage generation circuit of claim 2, wherein the first grayscale ratio of the first line data is a ratio of unit data having a grayscale corresponding to a gamma range including the intermediate gamma voltage.

4. The gamma voltage generation circuit of claim 1, wherein the gamma control logic circuit is configured to selectively activate the first tap change signal in response to the first grayscale ratio satisfying a threshold condition.

5. The gamma voltage generation circuit of claim 1, wherein the first variable tap gamma amplifier comprises:

an input switch configured to select one of the first reference voltage or the second reference voltage as a non-inverting input voltage in response to the first tap change signal;

a feedback switch configured to select one of the first tap voltage or the second tap voltage as an inverting input voltage in response to the first tap change signal;

an input stage configured to generate a pull-up voltage and a pull-down voltage based on the inverting input voltage and the non-inverting input voltage;

a main-output stage configured to generate the first tap voltage based on the pull-up voltage and the pull-down voltage; and a sub-output stage configured to generate the second tap voltage based on the pull-up voltage and the pull-down voltage.

6. The gamma voltage generation circuit of claim 1, wherein the first variable tap gamma amplifier includes:

an input switch configured to select one of the first reference voltage or the second reference voltage as a non-inverting input voltage in response to the first tap change signal;

an output stage configured to output an output voltage to an output terminal based on a pull-up voltage and a pull-down voltage;

an input stage configured to receive the output voltage as an inverting input voltage and to generate the pull-up voltage and the pull-down voltage based on the non-inverting input voltage and the inverting input voltage; and an output switch configured to connect the output terminal with one of the first terminal and the first intermediate terminal in response to the first tap change signal.

7. The gamma voltage generation circuit of claim 1, further comprising:

a second resistor string connected between the first terminal and a second terminal, and configured to output a plurality of second gamma voltages; and a second variable tap gamma amplifier configured to output a third tap voltage to the second terminal using a third reference voltage, wherein the gamma control logic circuit is configured to selectively activate a second tap change signal based on a second grayscale ratio of the first line data, and wherein the second variable tap gamma amplifier is configured to output a fourth tap voltage to a second intermediate terminal of the second resistor string using a fourth reference voltage in response to activation of the second tap change signal.

8. The gamma voltage generation circuit of claim 1, further comprising:

a first tap selection circuit configured to select the first intermediate terminal, to which the second tap voltage is provided, from among a plurality of terminals of the first resistor string in response to a first tap selection signal, wherein the gamma control logic circuit is configured to generate the first tap selection signal based on the first grayscale ratio of the first line data.

9. The gamma voltage generation circuit of claim 1, further comprising:

a reference voltage generation circuit configured to generate a plurality of reference voltages; and a reference voltage selection circuit, wherein, in response to a reference voltage selection signal, the reference voltage selection circuit is configured to provide the first reference voltage and the second reference voltage, from among the plurality of reference voltages, to the first variable tap gamma amplifier.

10. The gamma voltage generation circuit of claim 9, wherein the gamma control logic circuit is configured to generate the reference voltage selection signal based on a gamma curve.

11. The gamma voltage generation circuit of claim 1, wherein the gamma control logic circuit is configured to withhold the first tap change signal in response to deactivation of a tap change enable signal.

12. The gamma voltage generation circuit of claim 1, wherein the first gamma voltages are provided to a data driver configured to drive data lines connected to a plurality of pixels based on the first line data.

13. The gamma voltage generation circuit of claim 1, comprising:

a 0-th gamma amplifier configured to output a 0-th tap voltage to the 0-th terminal using a 0-th reference voltage.

14. A display driving integrated circuit comprising:

a row driver configured to control a plurality of gate lines connected to a display panel;

a gamma voltage generation circuit configured to generate a plurality of gamma voltages;

a data driver configured to control a plurality of data lines connected to the display panel based on line data using the plurality of gamma voltages; and a gamma control logic circuit configured to control the gamma voltage generation circuit, wherein the gamma voltage generation circuit includes a first variable tap gamma amplifier configured to generate a first tap voltage corresponding to a first gamma voltage among the plurality of gamma voltages, wherein the gamma control logic circuit is configured to selectively activate a first tap change signal based on a first grayscale ratio of the line data, and wherein the first variable tap gamma amplifier is configured to generate a second tap voltage corresponding to a second gamma voltage, different from the first gamma voltage, from among the plurality of gamma voltages in response to activation of the first tap change signal.

15. The display driving integrated circuit of claim 14, further comprising:

a controller configured to provide a gate signal to the row driver and to update the line data in the data driver, in response to a vertical synchronization signal and a horizontal synchronization signal.

16. The display driving integrated circuit of claim 14, wherein the gamma control logic circuit is configured to activate the first tap change signal in response to the first grayscale ratio of the line data satisfying a threshold condition.

17. The display driving integrated circuit of claim 16, wherein the first grayscale ratio is a ratio of data having a grayscale corresponding to a gamma range including the second gamma voltage.

18. The display driving integrated circuit of claim 14, wherein the gamma voltage generation circuit further includes:

a second variable tap gamma amplifier configured to generate a third tap voltage corresponding to a third gamma voltage among the plurality of gamma voltages, wherein the gamma control logic circuit is configured to selectively activate a second tap change signal based on a second grayscale ratio of the line data, and wherein the second variable tap gamma amplifier is configured to generate a fourth tap voltage corresponding to a fourth gamma voltage, different from the first, second, and third gamma voltages, from among the plurality of gamma voltages in response to activation of the second tap change signal.

19. The display driving integrated circuit of claim 18, wherein the gamma control logic circuit is configured to simultaneously output the first and second tap change signals.

20. A variable tap gamma amplifier comprising:

an input switch configured to select one of a first reference voltage or a second reference voltage as a non-inverting input voltage in response to a first tap change signal;

a feedback switch configured to select one of a first tap voltage or a second tap voltage as an inverting input voltage in response to the first tap change signal;

an input stage configured to generate a pull-up voltage and a pull-down voltage based on the inverting input voltage and the non-inverting input voltage;

a main-output stage configured to generate the first tap voltage based on the pull-up voltage and the pull-down voltage; and a sub-output stage configured to generate the second tap voltage based on the pull-up voltage and the pull-down voltage, wherein the first tap voltage is provided to an external data driver as a first gamma voltage, wherein the second tap voltage is provided to the external data driver as a second gamma voltage, and wherein the first tap change signal is generated based on a grayscale ratio of a gamma range including the second gamma voltage from among line data provided to the external data driver.

* * * * *